(12) United States Patent
Debnath et al.

(10) Patent No.: US 10,678,669 B2
(45) Date of Patent: *Jun. 9, 2020

(54) FIELD CONTENT BASED PATTERN GENERATION FOR HETEROGENEOUS LOGS

(71) Applicant: NEC Laboratories America, Inc., Princeton, NJ (US)

(72) Inventors: Biplob Debnath, Princeton, NJ (US); Hui Zhang, Princeton Junction, NJ (US)

(73) Assignee: NEC Corporation (JP)

(*) Notice: Subject to any disclaimer, the term of this patent is extended or adjusted under 35 U.S.C. 154(b) by 191 days.

This patent is subject to a terminal disclaimer.

(21) Appl. No.: 15/956,381

(22) Filed: Apr. 18, 2018

(65) Prior Publication Data

US 2018/0307576 A1    Oct. 25, 2018

Related U.S. Application Data

(60) Provisional application No. 62/488,183, filed on Apr. 21, 2017.

(51) Int. Cl.
*G06F 11/00* (2006.01)
*G06F 11/34* (2006.01)
*G06F 11/07* (2006.01)
*G06F 11/30* (2006.01)
*G06F 16/35* (2019.01)

(52) U.S. Cl.
CPC .......... *G06F 11/34* (2013.01); *G06F 11/079* (2013.01); *G06F 11/0775* (2013.01); *G06F 11/3072* (2013.01); *G06F 16/35* (2019.01); *G06F 2201/86* (2013.01)

(58) Field of Classification Search
CPC .............. G06F 11/0775; G06F 11/079; G06F 11/3072; G06F 11/3476
See application file for complete search history.

(56) References Cited

U.S. PATENT DOCUMENTS

| 7,895,167 | B2 * | 2/2011 | Berg | G06F 11/0709 707/672 |
| 8,386,498 | B2 * | 2/2013 | Whitehouse | H04L 63/1425 707/755 |
| 8,495,429 | B2 | 7/2013 | Fu et al. | |
| 8,620,928 | B1 * | 12/2013 | Walton | G06F 17/2247 707/748 |

(Continued)

OTHER PUBLICATIONS

Hamooni et al., "LogMine: Fast Pattern Recognition for Log Analytics", CIKM'16, Oct. 2016, 10 pages.

*Primary Examiner* — Elmira Mehrmanesh
(74) *Attorney, Agent, or Firm* — Joseph Kolodka

(57) ABSTRACT

A system and method are provided for pattern discovery in input heterogeneous logs having unstructured text content and one or more fields. The system includes a memory. The system further includes a processor in communication with the memory. The processor runs program code to preprocess the input heterogeneous logs to obtain pre-processed logs by splitting the input heterogeneous logs into tokens. The processor runs program code to generate seed patterns from the preprocessed logs. The processor runs program code to generate final patterns by specializing a selected set of fields in each of the seed patterns to generate a final pattern set.

8 Claims, 12 Drawing Sheets

(56) References Cited

U.S. PATENT DOCUMENTS

| | | | |
|---|---|---|---|
| 9,626,414 B2* | 4/2017 | Kanjirathinkal | G06F 16/24578 |
| 2004/0230577 A1* | 11/2004 | Kawatani | G06K 9/6218 |
| 2007/0283194 A1* | 12/2007 | Villella | G06F 11/3476 |
| | | | 714/57 |
| 2011/0066585 A1 | 3/2011 | Subrahmanyam et al. | |
| 2013/0246315 A1* | 9/2013 | Joshi | G06N 5/04 |
| | | | 706/10 |
| 2014/0006010 A1* | 1/2014 | Nor | G06F 17/2282 |
| | | | 704/9 |
| 2014/0344622 A1 | 11/2014 | Huang et al. | |
| 2015/0025875 A1 | 1/2015 | Perrone | |
| 2015/0039651 A1* | 2/2015 | Kinsely | G06F 16/254 |
| | | | 707/779 |
| 2015/0094959 A1 | 4/2015 | Ning et al. | |
| 2018/0046697 A1* | 2/2018 | Maciolek | G06F 16/285 |
| 2018/0060314 A1* | 3/2018 | Xu | G06F 16/1794 |
| 2018/0285397 A1* | 10/2018 | Huang | G06F 16/31 |
| 2018/0349388 A1* | 12/2018 | Skiles | G06F 3/0482 |

* cited by examiner

FIELD CONTENT BASED PATTERN GENERATION FOR HETEROGENEOUS LOGS

RELATED APPLICATION INFORMATION

This application claims priority to provisional application Ser. No. 62/488,183, filed on Apr. 21, 2017, and incorporated herein by reference.

BACKGROUND

Technical Field

The present invention relates to log processing, and more particularly to field content based pattern generation for heterogeneous logs.

Description of the Related Art

A log is a semi-structured record which carries operational information. Log analysis is the process of transforming raw logs, that is, written records of software systems events, into information that helps operators and administrators to solve problems. Log analysis is used in a variety of domains such as detecting security threats, compliance auditing, power plant fault detection, or data center operations. The ability to analyze logs quickly and accurately is critical to reduce system downtime and detect operational problems before or while they occur.

Administrators of most user-facing systems depend on periodic log data to get an idea of the health and status of production applications. Log report information can be crucial in diagnosing the root cause of complex problems. A critical aspect of a log that enables fast and accurate analysis is its structure. Knowing the structure of a log greatly helps in easy extraction of specific system information, such as the type, time of creation, or source of a specific event, or the value of key performance indicators. Without a known log structure, log analysis becomes a simple keyword-based text search tool. In fact, most commercial log analytics platforms today allow users to directly specify log patterns to parse logs based their domain knowledge An important component of log analysis is recognizing the patterns. However, current recognition techniques are not as fast or efficient as needed. Accordingly, there is a need for an improved technique for recognizing patterns in logs.

A log is a semi-structured record which carries operational information. Log analysis is the process of monitoring and extracting valuable information from logs to resolve a problem.

Today, most sophisticated technologies like Internet of Things (IoT), Big Data, Cloud, data center consolidation, and so forth, demand smarter IT infrastructure and operations. Such technologies continuously generate lots of logs to report their operational activities. Efficient operation and maintenance of the infrastructure requires applications, such as troubleshooting, debugging, monitoring, security breaching in real-time.

Logs spot the fundamental information for these applications and are useful to diagnose the root cause of a complex problem. Due to the high volumes, velocities, and varieties of log data, it is an overwhelming task for humans to analyze these logs without a real-time scalable log analysis solution. Hence, there is a need for a real-time log analysis system.

SUMMARY

According to an aspect of the present invention, a system is provided for pattern discovery in input heterogeneous logs having unstructured text content and one or more fields. The system includes a memory. The system further includes a processor in communication with the memory. The processor runs program code to preprocess the input heterogeneous logs to obtain pre-processed logs by splitting the input heterogeneous logs into tokens. The processor runs program code to generate seed patterns from the preprocessed logs. The processor runs program code to generate final patterns by specializing a selected set of fields in each of the seed patterns to generate a final pattern set.

According to another aspect of the present invention, a computer-implemented method is provided for pattern discovery in input heterogeneous logs having unstructured text content and one or more fields. The method includes preprocessing, by a processor, the input heterogeneous logs to obtain pre-processed logs by splitting the input heterogeneous logs into tokens. The method further includes generating, by the processor, seed patterns from the preprocessed logs. The method also includes generating, by the processor, final patterns by specializing a selected set of fields in each of the seed patterns to generate a final pattern set.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
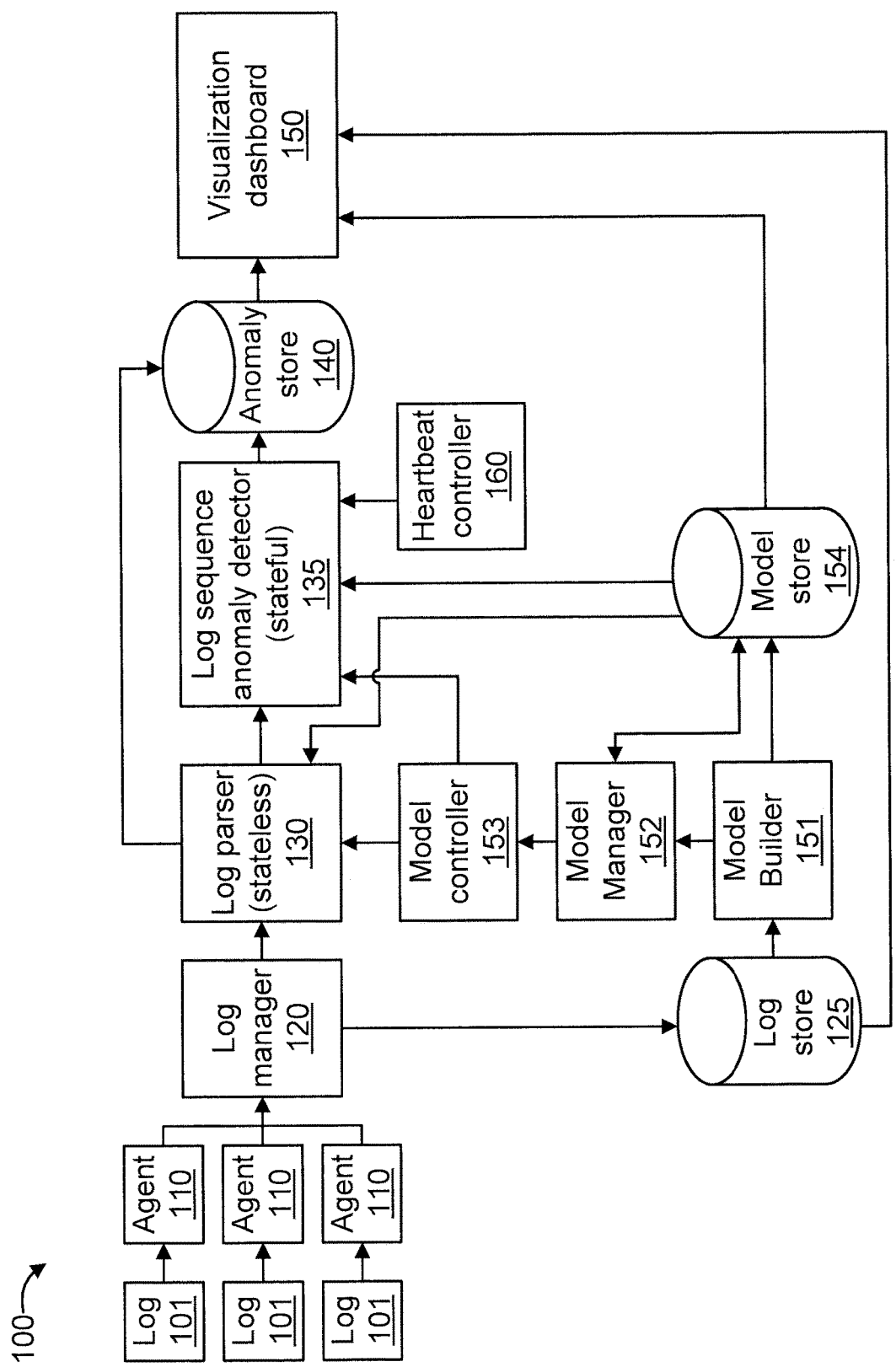
FIG. 1 is a block diagram showing an exemplary system for pattern generation for heterogeneous logs, in accordance with an embodiment of the present invention.
Figure 2:
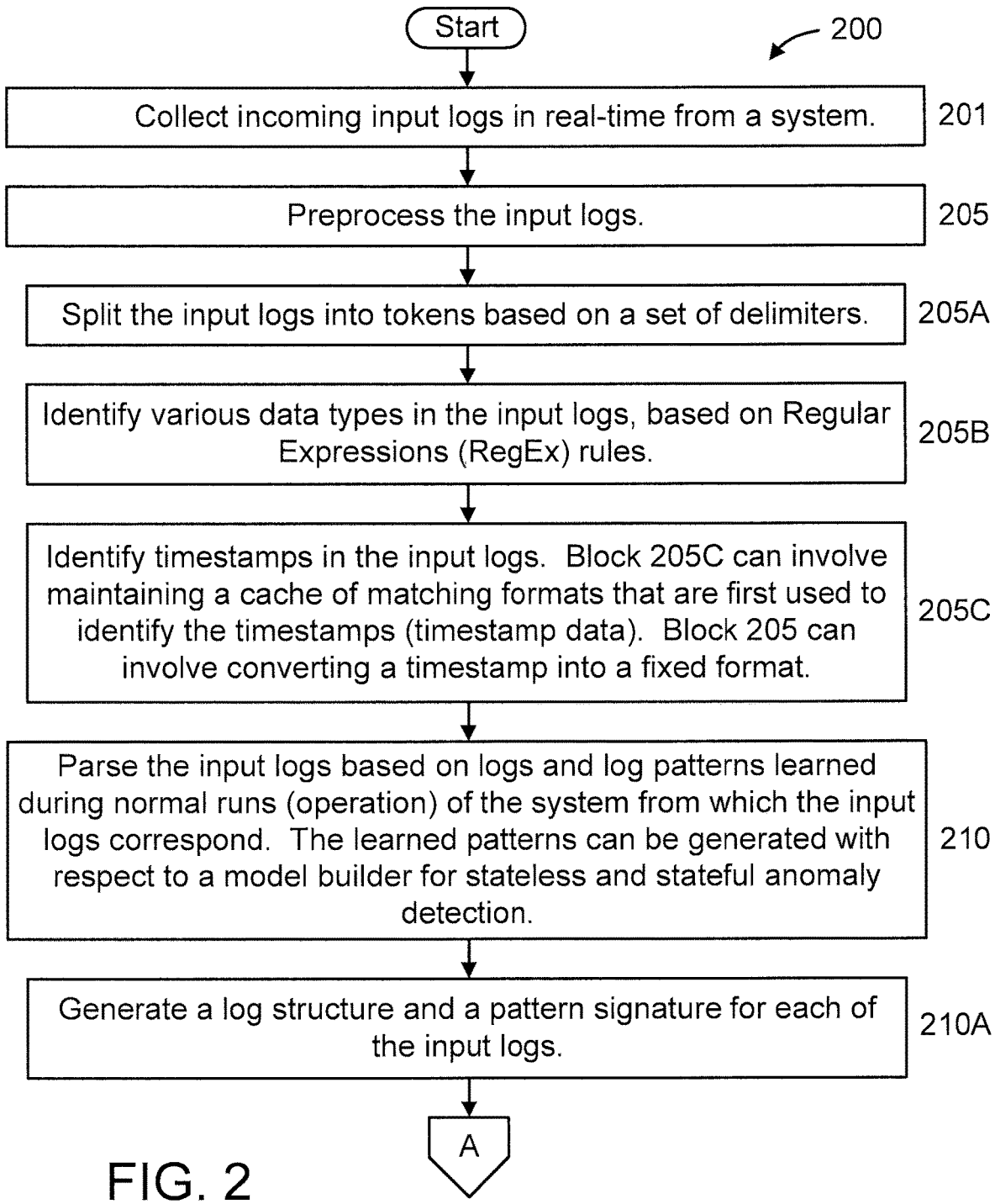
FIGS. 2-5 are flow diagrams showing an exemplary method for pattern generation for heterogeneous logs, in accordance with an embodiment of the present invention.
Figure 3:
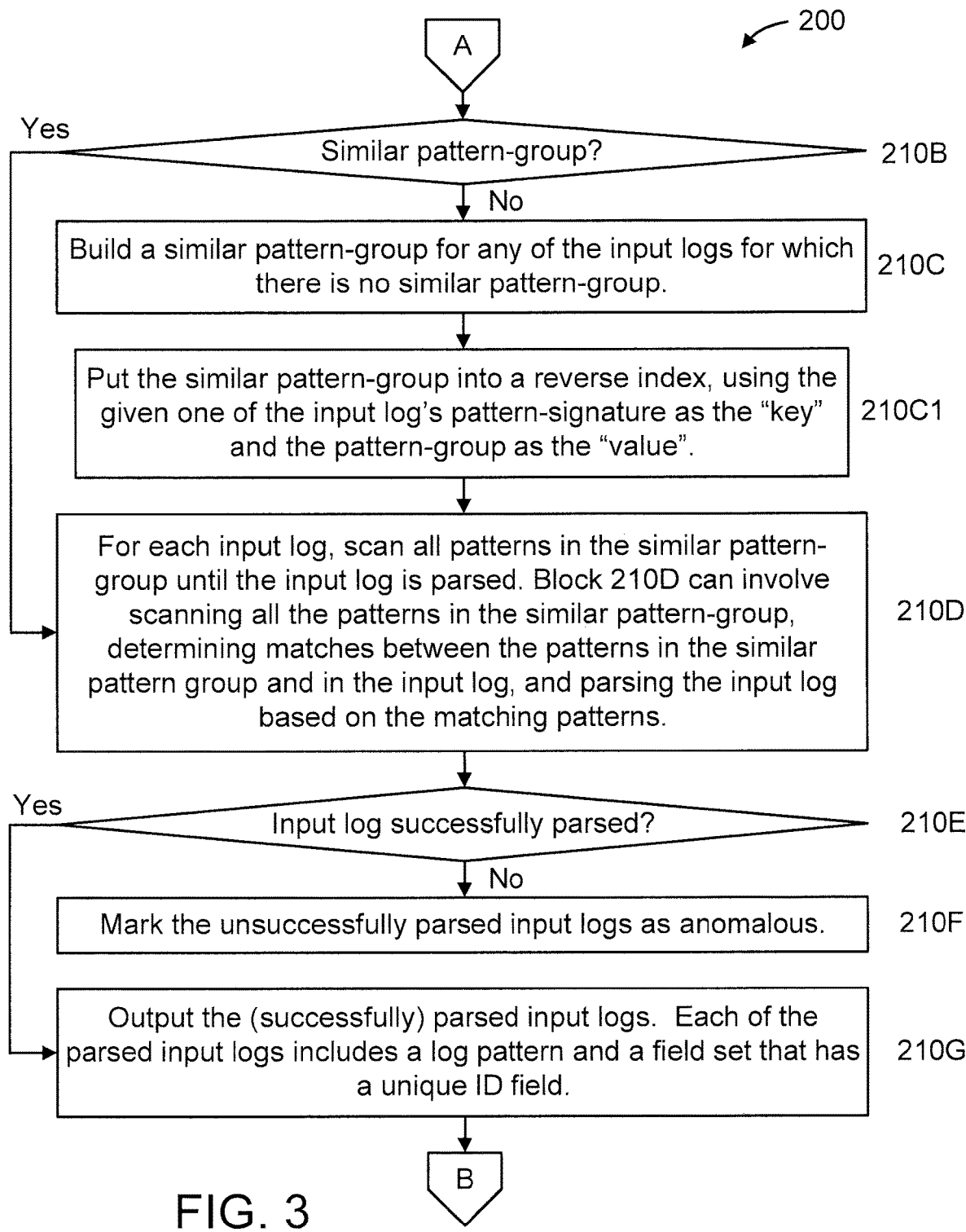
Figure 4:
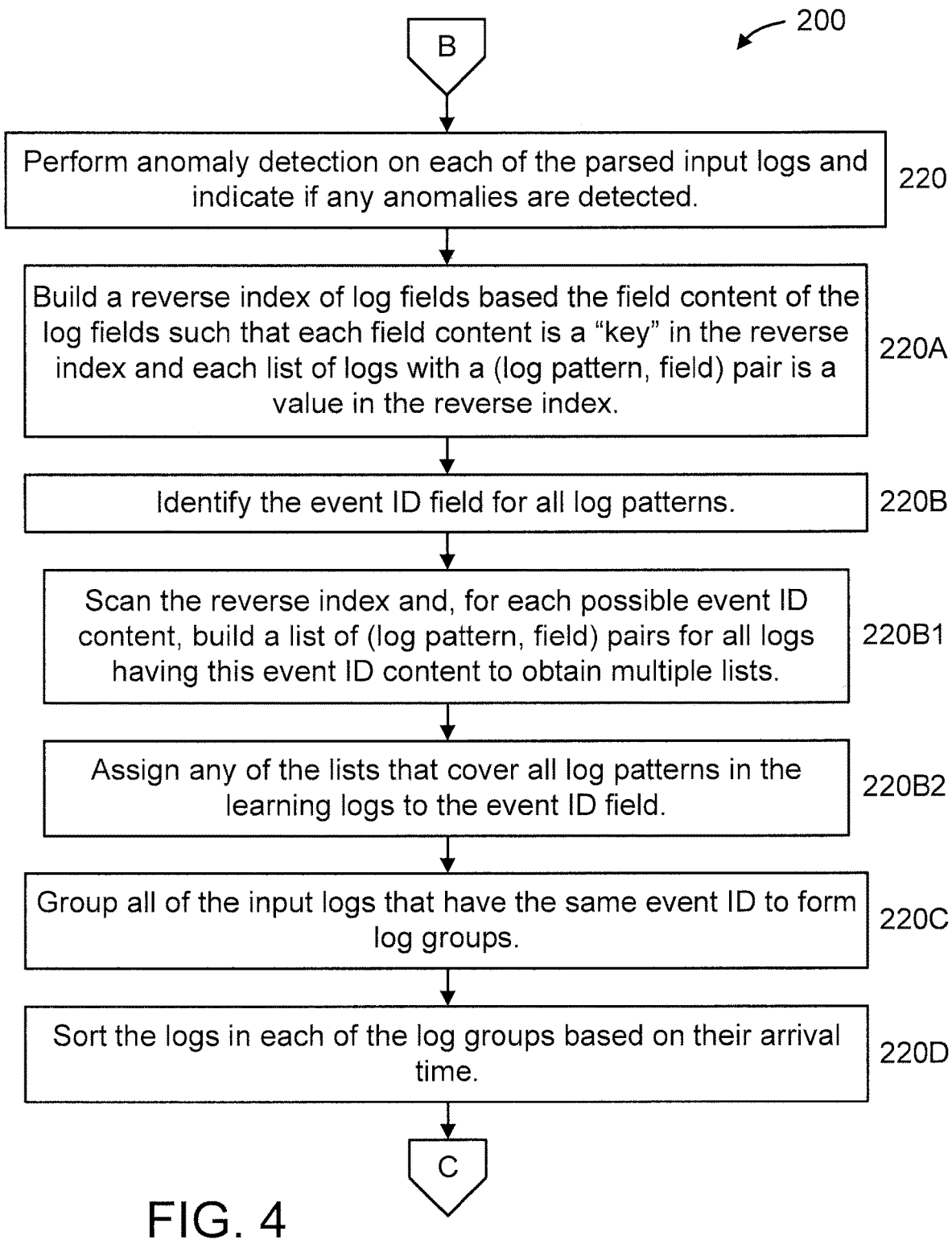
Figure 5:
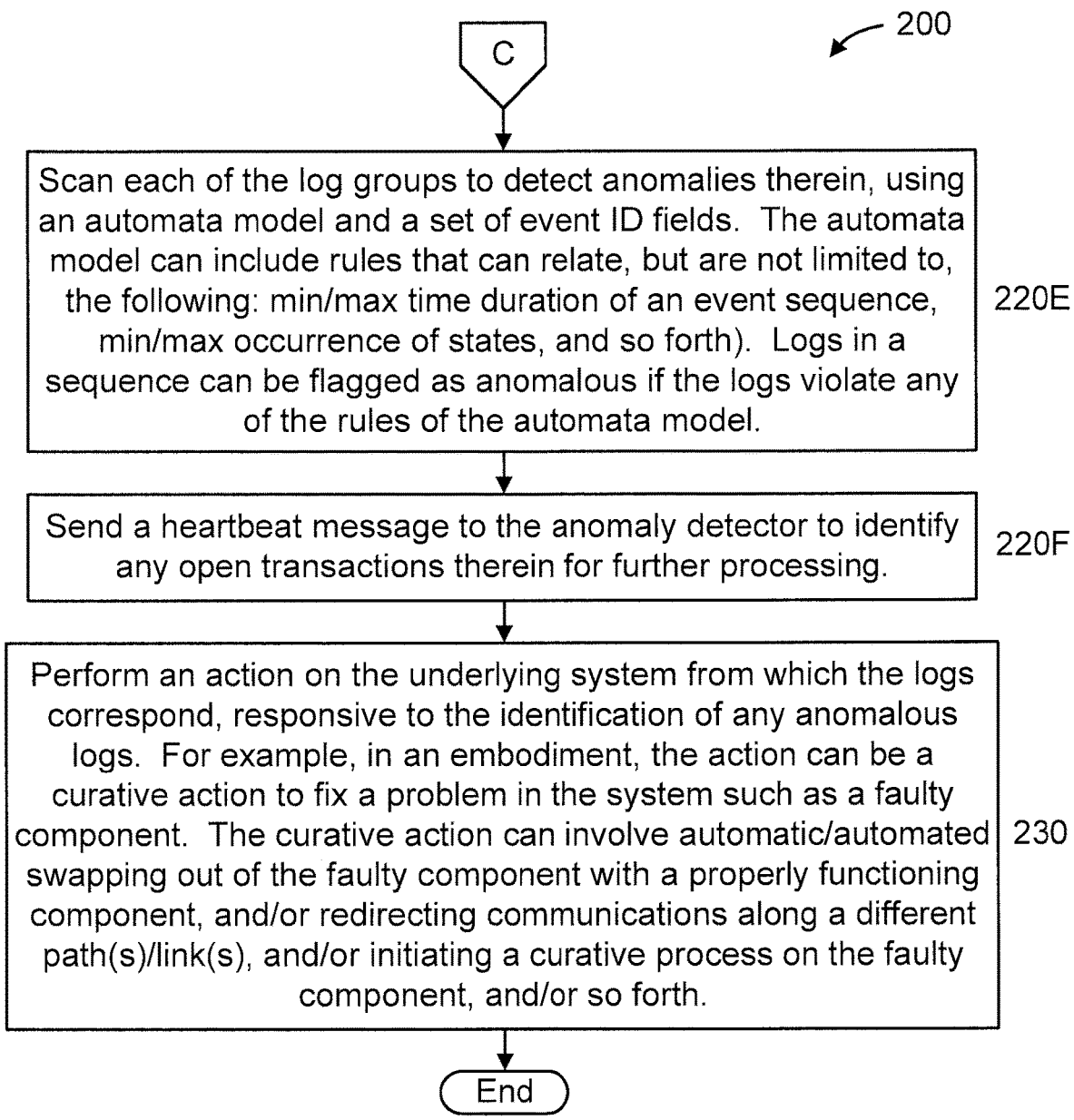

The present invention is directed to field content based pattern generation for heterogeneous logs.

In an embodiment, the present invention provides an end-to-end automated log analysis system. The system and various aspects relating thereto are described with respect to at least FIGS. 1-8.

The end-to-end automated log analysis system can be used for various different approaches for pattern generation, depending upon the implementation.

In an embodiment, the end-to-end automated log analysis system can be used for semantic knowledge based pattern generation for heterogeneous logs. The semantic knowledge based pattern generation and various aspects relating thereto are described with respect to at least FIGS. 1-8.

In an embodiment, the end-to-end automated log analysis system can be used for field content based pattern generation for heterogeneous logs. The field content based pattern generation and various aspects relating thereto are described with respect to at least FIGS. 1 and 9-12.

In an embodiment, the present invention provides a 24/7 log analysis service, and continuously evolves to captures the system's updated behaviors.

In an embodiment, the present invention is based on and/or otherwise directed to one or more of the following.

Handling heterogeneous logs. Logs may have a variety of patterns dependent on their source and what the logs are trying to convey. An automated log analyzer should be able to handle any log format irrespective of its origin.

Minimizing human involvement. An automated log analyzer should ideally work from scratch without any prior knowledge or supervision. For logs from new sources, it should not require any human inputs. To this end, in an embodiment, the present invention uses unsupervised machine learning based techniques. Human interaction is limited to providing "training" datasets, which capture "correct" behaviors. The present invention learns models from these correct (i.e., normal) datasets, and uses them later to detect anomalies in real-time.

Handling data drift. System behavior typically evolves over time. Hence, log data characteristics and behavior models may also change. To this end, in an embodiment, the present invention periodically relearns various models, and updates existing models on the fly to adapt to system behavior changes.

Providing a generic framework. In an embodiment, a generic framework is provided which can capture most real-world use cases and challenges. To this end, in an embodiment, the present invention implements two exemplary anomaly detection algorithms. The first algorithm is stateless, while the second algorithm is stateful. Usually, stateful algorithms are more complex and need quite an effort to implement efficiently. For the stateful algorithm, in an embodiment, the present invention implements a log sequence anomaly detector, which exposes many real-world quirks.

Expediting periodic anomaly detection. Real-time anomaly detection algorithms are generally event driven. Expediting the detection of anomalies without waiting for a log (or in the event of log source failure) is a unique property that the present invention provides and tackles an important real-world challenge.

Building a log analysis service. The present invention provides a framework which can handle the high volume and high velocity of log streams in real-time. In addition, the present invention can avoid service disruptions (i.e., no downtime), and leverage existing big data processing frameworks (i.e., Spark, Mink®, Samza, and so forth) to minimize implementation and deployment effort. To this end, in an embodiment, the present invention uses a Spark big data processing framework because of its maturity, its huge echo system and community support, and its widespread adoption in the industry and academic realms. However, it has been found that even Spark (as well as other streaming frameworks) does not have all the features to meet the design goals of the present invention and, thus, the present invention enhances the Spark framework to provide such features.

FIG. 1 is a block diagram showing an exemplary system 100 for pattern generation for heterogeneous logs, in accordance with an embodiment of the present invention.

The system 100 includes a set of agents 110, a log manager 120, a log store (interchangeably referred to herein as "log storage") 125, a (stateless) log parser 130, a (stateful) log sequence anomaly detector 135, an anomaly store (interchangeably referred to herein as "anomaly storage") 140, a visualization dashboard 150, a model builder 151, a model manager 152, a model controller 153, a model store (interchangeably referred to herein as "model storage") 154, and a heartbeat controller 160.

Each of the agents 110 is a daemon process which collects logs 101 from multiple log sources and sends them to the log manager 120.

The log manager 120 receives logs from agents 110. The log manager 120 controls incoming log rate and identifies log sources. The log manager 120 forwards incoming logs to the log parser 130, and also stores them into the log store 125.

The log store 125 is the main storage or archival component of system 100. The log store 125 organizes logs based on log source information. Stored logs can be used for building models during log analysis. Stored logs can also be used for future log replay for further analysis, or for post-facto querying when troubleshooting errors.

The model builder 151 generates models for stateless or stateful anomaly detection. The model builder 151 takes a set of logs assuming that they represent normal behavior and uses unsupervised techniques to build models which are used for real-time anomaly detection. As log streams may evolve over time, models need to be updated periodically. Therefore, the model builder 151 collects logs from log store 125 and rebuilds the models accordingly and stores the rebuilt models on model store 154.

The model store 154 stores models. The anomaly detector 135 reads models directly from model store 154. Furthermore, the anomaly detector 135 is directly attached to a graphical user interface, so that a user can validate the models and update the models if required.

The model manager 152 reads model information from model store 154 and notifies model controller 153 for model updates. The present invention supports both automatic and human interaction inside model manager 152. For example, model manager 152 can have an automatic configuration to instruct model builder 151 to rebuild models using the last seven days data at every midnight (or any other schedule). In addition, model manager 152 allows a human expert to directly edit a model from the model store 154.

The model controller 153 gets notifications from the model manager 152 and sends a model control instruction to anomaly detector 135. Models can be added, updated or deleted. Each of them needs separately an instruction which includes detailed information about the procedure and location of the updated model. Anomaly detector 135 reads the control instruction and update models accordingly.

The heartbeat controller 160 helps to identify open transactions in the log sequence anomaly detector 153. The heartbeat controller 160 periodically sends echo (i.e., heartbeat) messages to the log sequence anomaly detector 153.

The log parser 130 takes incoming streaming logs, and a log-pattern model from the model manager 152 as input. The log parser 130 parses and creates a tokenized log for each input log in a streaming fashion and forwards it to log sequence anomaly detector. All unmatched logs are reported as anomalies and presented to the user. Log parser 130 is an example implementation of stateless anomaly detection.

The log sequence anomaly detector 135 captures an anomalous log sequence of an event (a transaction). A complex system processes event driven operation workflows. An event usually includes a sequence of actions which are treated as an operational unit for a business process such as, for example, updating a database, and so forth. As a log represents an action, an event includes a sequence of action logs. Log sequence anomaly detector 135 detects a malfunctioned event by analyzing its abnormal log sequences. The log sequence anomaly detector 135 uses an automata-based model to identify abnormal log sequences. As it requires a transaction, it is stateful. With the help of heartbeat controller 160, the anomaly detector 134 can easily detect open state in an event log sequence and report the open state as an anomaly even when there is no input from the log parser 130. The log sequence anomaly detector 135 stores all anomalies on anomaly store 140.

The anomaly store 140 stores all anomalies for human validation. Moreover, each anomaly has a type, severity, reason, location in logs, and so forth. All of the anomalies are stored in anomaly store 140 which is connected to a graphical user interface for user feedback.

The visualization dashboard 150 provides a graphical user interface and dashboard to the end users. The visualization dashboard 150 combines information from log store 125, model store 154, and anomaly store 140 to present anomalies to the users. Users can easily view anomalies and take actions to rebuild or edit models.

While the preceding description describes a high-level blueprint of the present invention, most of the components can be implemented in several different ways. In an embodiment, the present invention can use Elasticsearch®, a well-known NoSQL database as our storage database. Elasticsearch® provides valuable query facility that can be used for data exploration by the user. Furthermore, Elasticsearch® has close integration with Kibana®, which provides a framework for building visualization from-ends and writing interactive queries for Elasticsearch®. In an embodiment, the present can use Kafka® for shipping logs and communicating among different components. Of course, other components can also be used, as readily appreciated by one of ordinary skill in the art given the teachings of the present invention provided herein, while maintaining the spirit of the present invention.

FIGS. 2-5 are flow diagrams showing an exemplary method 200 for pattern generation for heterogeneous logs, in accordance with an embodiment of the present invention.

At block 201, collect incoming input logs in real-time from a system. In an embodiment, the input logs are heterogeneous logs. In another embodiment, the logs are homogeneous logs. As is evident, heterogeneous logs are typically more difficult to process, but are readily handled by the present invention.

At block 205, preprocess the input logs.

In an embodiment, block 205 can include one or more of blocks 205A through 205C.

At block 205A, split the input logs into tokens based on a set of delimiters.

At block 205B, identify various data types in the input logs, based on Regular Expressions (RegEx) rules.

At block 205C, identify timestamps in the input logs. In an embodiment, block 205C can involve maintaining a cache of matching formats that are first used to identify the timestamps (timestamp data). In an embodiment, block 205 can involve converting a timestamp into a fixed format.

At block 210, parse the input logs based on logs and log patterns learned during normal runs (operation) of the system from which the input logs correspond (per block 201). The learned patterns can be generated with respect to a model builder for stateless and stateful anomaly detection.

In an embodiment, block 210 can include one or more of blocks of 210A through 210G.

At block 210A, generate a log structure and a pattern signature for each of the input logs. In an embodiment, the log structure can involve field definitions, field dynamics, and field content information. In an embodiment, the log structure can be, for example, a standard format such as, for example, but not limited to, Comma Separated Values (CSV), JavaScript Object Notation (JSON), eXtensible Markup Language (XML), or a non-standard format. In an embodiment, the pattern signature for an input log is generated from the log structure of the input log. In an embodiment, the pattern signature for each input log can be obtained by concatenating all of the tokens and the datatype for the input log.

At block 210B, for each input log, determine whether or not there is a similar pattern-group which covers the log structure of the input log. If so, then proceed to block 210D. Otherwise, proceed to block 210C. In an embodiment, block 210B can be performed using a reverse index of log fields based on the content of the log fields. In an embodiment, block 210 can involve editing an existing pattern-group to make it "similar" to the input log to enable parsing of the input log.

At block 210C, build a similar pattern-group for any of the input logs for which there is no similar pattern-group.

In an embodiment, block 210C can include block 210C1.

At block 210C1, put the similar pattern-group into a reverse index, using the given one of the input log's pattern-signature as the "key" and the pattern-group as the "value".

At block 210D, for each input log, scan all patterns in the similar pattern-group until the input log is parsed. In an embodiment, block 210D can involve scanning all the patterns in the similar pattern-group, determining matches between the patterns in the similar pattern group and in the input log, and parsing the input log based on the matching patterns.

At block 210E, for each input log, determine whether or not the input log has been successfully parsed. If so, the proceed to block 210G. Otherwise, proceed to block 210F. An "otherwise" determination can result responsive to the input log being unable to be parsed or the similar pattern group having no patterns therein (i.e., it is empty).

At block 210F, mark the unsuccessfully parsed input logs as anomalous.

At block 210G, output the (successfully) parsed input logs. In an embodiment, each of the parsed input logs includes a log pattern and a field set that has a unique ID field.

At block 220, perform anomaly detection on each of the parsed input logs (output per block 210G) and indicate if any anomalies are detected. In an embodiment, the anomaly detection can involve stateless anomaly detection and stateful anomaly detection.

In an embodiment, block 220 can include one or more of blocks 220A through 220F.

At block 220A, build a reverse index (e.g., a table) of log fields based the field content of the log fields such that each field content is a "key" in the reverse index and each list of logs with a (log pattern, field) pair is a value in the reverse index.

At block 220B, identify the event ID field for all log patterns.

In an embodiment, block 220B can include one or more of blocks 220B1 and 220B2.

At block 220B1, scan the reverse index and, for each possible event ID content, build a list of (log pattern, field) pairs for all logs having this event ID content to obtain multiple lists.

At block 220B2, assign any of the lists that cover all log patterns in the learning logs to the event ID field.

At block 220C, group all of the input logs that have the same event ID to form log groups. Block 220C can be considered a clustering operation.

At block 220D, sort the logs in each of the log groups based on their arrival time. In an embodiment, the arrival times can be determined with respect to log collection per block 201. In an embodiment, the arrival times can be determined from the timestamps identified per block 205C.

At block 220E, scan each of the log groups to detect anomalies therein, using an automata model and a set of event ID fields. In an embodiment, the automata model can include rules that can relate, but are not limited to, the following: min/max time duration of an event sequence, min/max occurrence of states, and so forth). In an embodiment, logs in a sequence can be flagged as anomalous if the logs violate any of the rules of the automata model.

At block 220F, send a heartbeat message to the anomaly detector to identify any open transactions therein for further processing.

At block 230, perform an action on the underlying system from which the logs correspond, responsive to the identification of any anomalous logs. For example, in an embodiment, the action can be a curative action to fix a problem in the system such as a faulty component. In such a case, the curative action can involve automatic/automated swapping out of the faulty component with a properly functioning component, and/or redirecting communications along a different path(s)/link(s), and/or initiating a curative process on the faulty component, and/or so forth.

Figure 6:
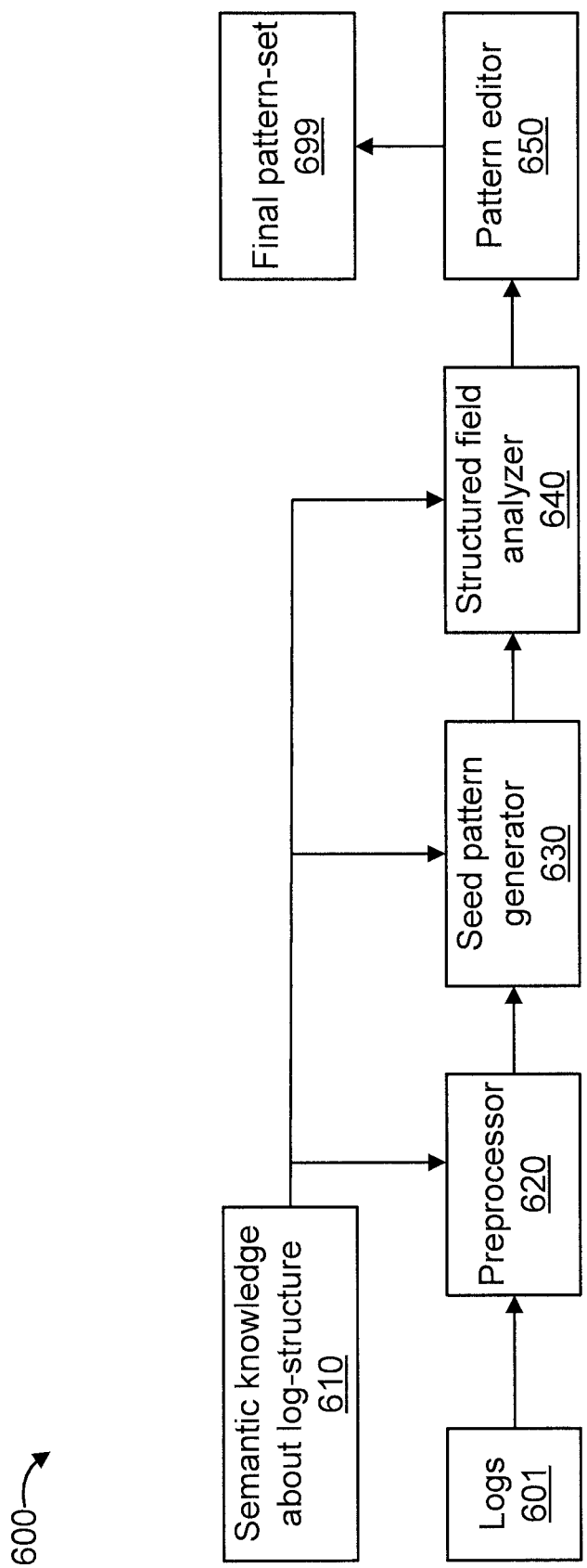
FIG. 6 is a block diagram showing a pattern generator, in accordance with an embodiment of the present invention.

FIG. 6 is a block diagram showing a pattern generator 600, in accordance with an embodiment of the present invention.

The pattern generator 600 includes a source 610 of semantic knowledge about log-structure, a preprocessor 620, a seed pattern generator 630, a structured field analyzer 640 to select a set of candidate fields from each seed pattern to edit, and a pattern editor 650 to generate final pattern set by specializing (i.e., editing) the candidate fields of the seed patterns. From input logs 601, a final pattern set 699 is generated.

Figure 7:
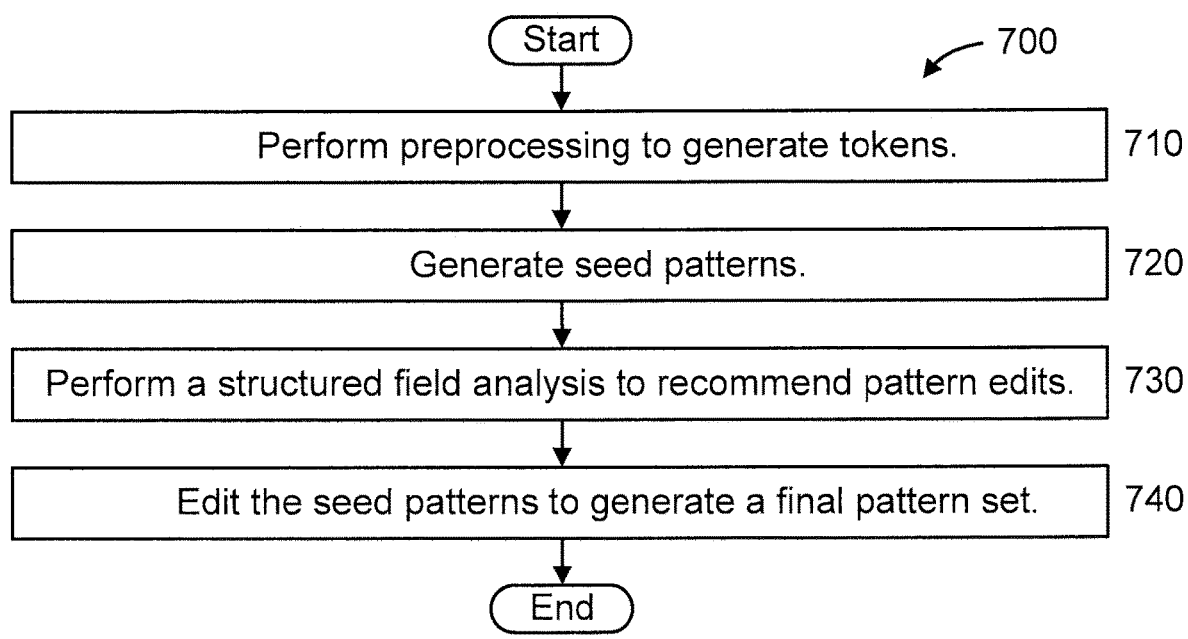
FIG. 7 is a flow diagram showing a method for pattern generation, in accordance with an embodiment of the present invention.

FIG. 7 is a flow diagram showing a method 700 for pattern generation, in accordance with an embodiment of the present invention. In an embodiment, method 600 is performed by system 600.

At block 710, perform preprocessing to generate tokens.

At block 720, generate seed patterns.

At block 730, perform a structured field analysis to recommend pattern edits.

At block 740, edit the seed patterns to generate a final pattern set.

Blocks 710 through 740 of method 700, as well as the elements of system 600 will now be further described, in accordance with an embodiment of the present invention.

The preprocessor 620 receives an input log 601, and based on semantic information from source 610, generates tokens which a pattern generator (for example, FPFA algorithm described later) can process. It will use a special connector (i.e., "+++") to concatenate multiple tokens of a field so that a pattern-generator will treat it as single token. For example: "DB Open Failed" would be concatenated as "DB+++Open+++Failed".

Note that, it will exclude DATETIME, IP, NUMER, WORD, NOTESPACE fields.

The seed pattern-generator 630 will generate a set of seed patterns. The seed pattern-generator 630 can also use semantic-knowledge for naming fields (i.e., for a log ID field instead of generic name P1F1, it will name is as P1F1_log ID).

The structured field analyzer 640 recommends a set of fields based on their statistical properties to edit to the pattern editor. To that end, the structured field analyzer 640 parses input logs using the seed pattern, and profiles every field's contents (similar to Type2). The structured field analyzer 640 filters out the unstructured fields. If the number of tokens is not fixed after splitting by the special connector (i.e., "+++"), it will be considered as an unstructured field. The structured field analyzer 640 analyzes structured fields and identifies ID field candidates. Optionally, it may leverage some user-supplied semantic knowledge about the log-structure to expedite ID field identification process. For example, for "Point of sales" logs, the "event" field can be a good candidate based on a user's domain knowledge. The structured field analyzer 640 may use cardinality, field importance, entropy or other information. The FPGA algorithm described later shows a specific methodology to leverage statistical properties. One simply rule could be as follows: (a) for WORD and NOTSPACE fields, if the cardinality is 1, then it is an ID candidate; (b) sort the field based on field importance and pick the non-numeric field with the highest field importance, and break ties using entropy or cardinality. These ID field candidates will serve as a basis for pattern editing (i.e., specialization) recommendation.

The pattern editor 650 edits the seed patterns by specializing the ID candidate fields with their specific values observed in the input logs to generate the final pattern set 699. The pattern editor 650 specializes the seed patterns based on the pattern editing recommendation.

A description will now be given regarding potential semantic knowledge that can be included in source 610 of system 600.

The semantic knowledge can include, for example, syntax for a field definition (i.e., email, MAC address, and so forth). Users are permitted to define new data types.

The semantic knowledge can further include, for example, semantics for the field content (i.e., log ID, pid, log Body, length, and so forth). For example, instead of a generic field name "P1F1", using semantics we can name field as P1F1_log ID, thus the user can easily understand the relevance of a field in a pattern.

Moreover, the semantic knowledge can further include, for example, one or more of the following:

Field dynamics: whether its contents are fixed, variable, or random in nature.

Specialization candidate (can be used to expedite Structured Field Analysis).

Datetime format (can be used to parse date-time fields if this is a new format and absent in the predefined internal datetime formats).

Field Attributes (IGNORE, RANGE_CHECK, MEMBERSHIP_TEST).

Special connector (default value is "+++"). It is possible to automatically assign a special connector by scanning data.

A description will now be given regarding how to input/specify semantic knowledge, in accordance with an embodiment of the present invention.

JSON based format. For specifying syntax, semantics, properties of the log structure, JSON will provide us huge flexibility for adding/removing properties.

Potential Mechanisms:

Option 1: Preprocessing all (training/testing) logs. The user will preprocess all logs with a special fieldSeparator. For "csv", the fieldSeparator is "," (i.e., a comma).

The present invention can use this fieldSeparator to split logs into various fields (i.e., it will infer field syntax), and associate them with user's semantic knowledge.

Option 2: Supplying a set of representative preprocessed log. It is an improvement over the previous mechanism to reduce the overhead of preprocessing all logs. User will supply a set of representative training logs preprocessed with a special fieldSeparator. A log analyzer will automatically discover field syntax by analyzing these representative logs. Later, discovered field syntax will be applied to all training/testing logs.

Option 3: Using GROK-based format. It is geared towards advanced users and developers. Gives limitless options for extension and customization. Moreover, defining new fields and supporting complex log structures would be quite easy.

A description will now be given regarding handling epoch time (option 1), in accordance with an embodiment of the present invention.

In the property section, a user can specify that datetime is expressed in terms of epoch. For example, Unix epoch time 1491225192, EST Time: 04/03/2017 09:13:12 am, and so forth.

A description will now be given regarding defining new data types (option 1), in accordance with an embodiment of the present invention.

By preprocessing all logs with a fieldSeparator, users may not even need to define (i.e., provide syntax) any new data types. Users only need to provide semantic information.

A description will now be given regarding supplying a set of representative logs (option 2), in accordance with an embodiment of the present invention.

It is an improvement on option 1 to remove the overhead of preprocessing all logs.

A user can supply a set of representative training logs preprocessed with a special fieldSeparator. The present invention will automatically infer field definition by analyzing these representative logs. Later, inferred field definitions will be applied to all training/testing logs.

A description will now be given regarding a GROK-based format (option 3), in accordance with an embodiment of the present invention.

For defining a new datatype, the user needs a language. We can use GROK to specify a field definition. Patterns can be GROK based. Syntax can be borrowed from LogStash. GROK uses regular expression (RegEx) for defining syntax. GROK has wide applicability and extensibility, thus it will be easy to add new datatypes. For example, a user can define EMAIL datatype with the following notation: EMAIL "(^[a-zA-Z0-9_.+-]+]+@[a-zA-Z0-9-]+\.[a-zA-Z0-9-.]+$)".

Users will input one (or more) GROK pattern(s) to parse the raw input logs into various fields to meet their domain knowledge. A user can use both new datatype and predefined datatypes to specify the GROK pattern.

A description of some GROK basics applicable to the present invention will now be described, in accordance with an embodiment of the present invention.

GROK works by combining text (RegEX) patterns into something that matches a log.

The syntax for a GROK pattern %{SYNTAX:SEMANTIC}.

The SYNTAX is the name of the pattern that will match your text. For example, 300 will be matched by the NUMBER pattern and 55.3.244.1 will be matched by the IP pattern. The syntax is how you match.

The SEMANTIC is the identifier you give to the piece of text being matched. For example, 300 could be the duration of an event, so you could call it simply duration. Further, a string 55.3.244.1 might identify the client making a request. For the above example, the GROK filter could look something like this: %{NUMBER:duration} %{IP:client}.

Thus, three different mechanisms/options have been described as follows.

(Option 1) Preprocessing all logs.

Pros: user friendly (very easy to understand).

Cons: users need to preprocess all logs with special separator; and works fine for single log source (i.e., all logs have similar structure).

(Option 2) Supplying a Set of Representative Preprocessed Logs.

Pros: user friendly (very easy to understand).

Cons: works fine for single log source (i.e., all logs have similar structure); and users may not even know what a good representative set would be.

(Option 3) Using GROK-based format.

Pros: very flexible and extensible; and allows users to define new data types, and to specify complex log structure formats.

Cons: geared towards advanced users and developers; and users need to understand GROK basics and RegEx.

A description of relating to log structure, in accordance with an embodiment of the present invention.

Format: Structure itself (separator, sequence of token, . . . ). The format can be, but is not limited to, XML, CSV, syslog, JSON, and so forth.

Fixed part: Strings which don't change and are common between multiple logs, for example, "session opened"", "Accepted password", and so forth.

Variable part: IP address, MAC address, Number, ID, and so forth.

A description of relating to tokens applicable to the present invention will now be described, in accordance with an embodiment of the present invention.

Token: component of log and its pattern.

Attribute of token: automatically classified (fixed or variable).

"Token type": type of each token, defined by user or automatically classified.

Automatically classified token type. The token type can be a superficial type such as, for example, number, character, hexadecimal, and so forth. The token type can be a predefined general type such as, for example, date, time, IP address, MAC address, UUID, and so forth.

User defined token type. The preceding can be domain specific, knowledge based, and so forth. It can be, for example, a port number, a user ID, a process ID, a request ID, a unit, and so forth.

A further description will now be given regarding various elements of the present invention as shown in FIGS. 1 through 7, in accordance with one or more embodiments of the present invention.

To that end, a further description will now be given regarding the (stateless) log parser 130 of FIG. 1, in accordance with an embodiment of the present invention.

The log parser 130 parses logs using patterns learned from normal runs by a system. Here, we define a "pattern" as a GROK expression. For example, for the log "LogLens published in ICDCS 2018", one of the matching GROKs (i.e., patterns) is "%{WORD: Title} published in %{WORD: Conference}%{NUMBER:Year}", and after parsing we get {"Title": "LogLens", "Conference": "ICDCS", "Year": 2018} as an output. Parsed outputs can be used a building block for various log analysis features. For example, our stateful algorithm uses them to detect log sequence violations. In an embodiment, the present invention reports an anomaly, if it fails to parse a streaming log.

A description will now be given regarding model building, in accordance with an embodiment of the present invention.

Existing log analysis tools like Logstash®, Sumo Logic®, Loggly®, Logentries, Graylog, SherLog, and Stitch either use user defined regular expressions (RegEx) or source-code level information for log analysis. Thus, these tools are supervised and need human involvement. Recently, LogMine introduced an unsupervised algorithm, however it not fast.

A description will now be given regarding preprocessing, in accordance with an embodiment of the present invention.

In an embodiment, the present invention preprocesses a log by splitting it into individual units called tokens. Splitting is done based on a set of delimiters. The default value is white space characters, SPACE (i.e., space, tab, etc.), explained in TABLE 1. In an embodiment, the present invention can also allow users to provide delimiters to overwrite default delimiters in order to meet their needs. In addition, user can provide regular expression (RegEx) based rules to split a token into multiple sub-tokens. For example, to split token "123 KB" into sub-tokens "123" and "KB", the user can provide the following RegEx rule: "[0-9]+KB"→" [0-9]+KB".

the heterogeneity of datetime formats. In an embodiment, the present invention allows users to provide datetime formats to identify timestamp fields. However, if a user does not specify any formats, the present invention identifies timestamps based on a set of predefined formats. In an embodiment, the present invention allows users to add more formats. The worst-case time complexity of identifying a timestamp using a set of predefined datetime format is O(k), where k is the total number predefined datetime formats. After exploring several alternatives (including a set of compact RegExes), the present invention provides the following two optimizations to reduce this time complexity as follows:

Caching matched formats. Using caching of matched datetime formats, the present invention reduces the amortized time complexity to O(1). In an embodiment, the present invention maintains a cache of the matched formats. When a log arrives, first the present invention starts with cached formats. If no match is found using the cached formats, then the present invention tries the remaining formats. If any match is found from the remaining formats, then the corresponding format will be added to the cache. In the cache, formats are maintained in descending length order. This caching strategy works well in practice as logs from the same (or similar) sources exhibit the same datetime formats, and every source uses only few different datetime formats to record timestamps.

Filtering. In an embodiment, the present invention first searches a set of keywords based on the most common form of specifying month (i.e., 01-12, 1-9, Jan-Dec, January-December), day (i.e., 01-31), and hour (i.e., 00-59), days of the week (i.e., Mon-Sun, Monday-Sunday), and so forth, to filter out tokens which will not match any predefined datetime formats. If search is successful, then the present invention scans predefined datetime formats to find a match.

A description will now be given regarding pattern signature generation, in accordance with an embodiment of the present invention.

The present invention clusters logs based on a pattern-signature generated from the log structures. Later, it generates GROK patterns based on these pattern signatures. In an embodiment, the present invention has two main steps as follows.

TABLE 1

| Datatype | Regular Expression (RegEx) Syntax |
|---|---|
| WORD | {A-Za-z}+ |
| IP | {0-9}{1,3}.{0,9}{1,3}.{0,9}{1,3}.{0,9}{1,3} |
| DATETIME | {0-9}{4}/{0-9}{2}/{0/9}{2}{0,9}{2}.{0-9}{2}.{0,9}{2}.{0,9}{2} |
| NUMBER | -?{0-9}+{.[0-9]}+)? |
| NOTSPACE | \S+ |
| SPACE | \s+ |
| ANYDATA | .* |

A description will now be given regarding data type identification, in accordance with an embodiment of the present invention.

During this step, for every token, the present invention identifies various data types such as DATETIME, IP, WORD, NUMBER, and NOTSPACE (i.e., a mix of alphabets, digits, and other punctuation characters except white space symbols) based on RegEx rules. TABLE 1 shows RegEx rules for identifying different data types.

The present invention also identifies timestamps and unifies them into a uniform format "yyyy/MM/dd HH:mm: ss.SSS". However, it is a very cumbersome process due to First, the present invention generates a pattern-signature for every log by concatenating all of its tokens and datatype. It has three different settings for the log structures as follows: HIGH_EX; MEDIUM_EX; and LOW_EX. These settings are defined in TABLE 2. Intuitively, the HIGH setting treats DATETIME, IP, and NUMERIC tokens as variable fields, the LOW_EX setting treats all tokens as variable fields, and the MEDIUM_EX setting treats all tokens except alphabet-based tokens (i.e., WORD) as variable fields. The HIGH_EX setting produces the largest numbers of patterns, while the LOW_EX setting produces the fewest number of patterns. The MEDIUM_EX setting produces patterns in between. The present invention uses MEDIUM_EX as the default setting based on this intuition, and does not treat words as variable fields, and usually programmers express debugging information in words. TABLE 3 shows an example of pattern signatures using three different pattern settings.

TABLE 2

| Setting | Datatype Identification |
| --- | --- |
| HIGH_EX | DATETIME, IP, NUMBER |
| MEDIUM_EX | DATETIME, IP, NUMBER, NOTSPACE |
| LOW_EX | DATETIME, IP, NUMBER, NOTSPACE, WORD |

TABLE 3

| Setting | Datatype Identification |
| --- | --- |
| HIGH_EX | DATETIME IP *LogLens demo#*1 NUMBER |
| MEDIUM_EX | DATETIME IP *LogsLens* NOTSPACE NUMBER |
| LOW_EX | DATETIME IP WORD NOTSPACE NUMBER |

Next, the present invention determines the uniqueness of signatures. The present invention maintains an index for all unique pattern-signatures. Every index entry includes a pattern-signature as a key and its associated metadata as a value. The metadata includes the original log, the preprocessed log, and a counter. Thereafter, the present invention uses log messages to demonstrate how incoming logs will be parsed using GROK corresponding to the pattern-signature, while it uses counter value to filter out patterns not satisfying a user's minimum count requirement (the default minimum count value is 1) and to show statics to the users.

For every incoming log, the present invention searches this index using its pattern-signature. If match is found, it means that the present invention already found a log covering this incoming log, so it simply discards this log, and increases the counter by one. Otherwise, the present invention stores the pattern-signature with associated log (and preprocessed) message in an index. In addition, it sets the counter value to one.

A description will now be given regarding pattern generation, in accordance with an embodiment of the present invention.

The present invention generates one pattern for every unique pattern signature index entry in the form of a GROK expression. The present invention assigns a field ID for each variable field. The field ID includes two parts as follows: the ID of the log pattern that this field belongs to; and the sequence number of this field compared to other fields in the same pattern. The pattern IDs are assigned with the integer number {1, 2, 3, . . . , n} for a log pattern set of size n, and the field sequence order can be assigned with the integer number {1, 2, 3, . . . , k} for a log pattern with a total of k data types.

A description will now be given regarding pattern editing, in accordance with an embodiment of the present invention.

The present invention automatically generates patterns. However, the patterns may not always meet user needs. In addition, users may want to generate patterns from one system, and later want to apply them to a different, but similar system with some modifications. Users may even want to delete some patterns or add new patterns. To provide flexibility to the users, the present invention allows users to edit the automatically generated patterns.

For every pattern, the present invention shows a GROK pattern, a sample original log message and corresponding preprocessed output count, as well as a GROK parsing output so that users can easily understand the functionality of a pattern and can make an editing decision. The present invention allows users to edit a data type definition to include multiple tokens under one field. To support this feature, the present invention introduces a new data type ANYDATA (i.e., wildcard), which is defined in TABLE 1. The present invention also allows users to put a semantic meaning on the field by renaming generic field names. For example, the present invention may assign "P1F1" as a generic field name for a "log Time" field, thus it may be difficult for the user to interpret the parsed output. Now, by renaming "P1F1" to "log Time", a user can fix this issue. A user can also specialize a field. For example, a user can replace "%{NUMBER:P1F5}" by "123". Moreover, a user can also generalize a token. For example, a user can replace "LogLens" by "%{WORD:P1NewField}".

It is to be appreciated that the pattern editing feature is very useful to users. Given millions of logs, users usually have no clue how/where to start. In contrast, by automatically generating a few patterns from these million logs, users can easily find clues about the system's underlying behaviors, and they can edit these generic patterns to incorporate their domain knowledge.

A description will now be given regarding anomaly detection, in accordance with an embodiment of the present invention.

The present invention uses GROK patterns discovered during the modeling stage for anomaly detection. If a log does not match any patterns, then the log is reported as an anomaly. If a match is found, then the present invention parses the log into various fields based on the matched GROK and forwards the output to the stateful anomaly detector 135.

Logstash® is a popular open-source log parsing tool, which can parse logs using GROK patterns. However, it has been found Logstash® suffers from a severe scalability problem. That is, Logstash® cannot handle large number of patterns, and consumes huge memory. Since the present invention generates patterns automatically, it may generate huge number of patterns which is very problematic for Logstash®.

The log parsing problem using a set of patterns can be formalized as follows: "Given a set of m GROK patterns, and a set of n logs, find out a log-to-pattern mapping". A naive solution is to scan all m patterns to find a match for every input log. This simple algorithm needs on the average $m/2$ comparisons for the matched logs, while for the unmatched logs it incurs m comparisons. Thus, the overall time complexity is $O(mn)$.

In an embodiment, the present invention aims to reduce the number of comparisons to $O(1)$, thus overall time complexity would be $O(n)$. For the unmatched logs, it uses $O(1)$ comparison, while for matched logs the comparison depends on the average size of the similar pattern-group (explained hereinafter).

The present invention uses the following three major steps:

Step 1. To parse an input log, the present invention first generates a log structure (explained hereinafter) and finds out if there is a similar pattern-group which covers this log structure. To speedup this step, the present invention uses an index (see Step 3).

Step 2. If a similar pattern-group is found, then the present invention scans all patterns in that group until the input log is parsed. If the input log cannot be parsed or a similar group has no patterns (i.e., it is empty), then the present invention reports it as an anomaly.

Step 3. If no similar group is found, then the present invention builds a similar pattern-group (note that it could be empty). Next, the present invention puts this group in an index, using input logs pattern-signature as the "key" and pattern-group as the "value". Finally, it follows Step 2.

A description will now be given regarding building a similar pattern-group. The present invention compares an input log with all m GROK patterns to find out if the input log matches the m GROK patterns and puts all matched patterns in one group. In a group, patterns are sorted in the ascending order of datatype's generality (and number of tokens in case of tie). For example, "WORD" get precedence over "NOTSPACE".

Now, we describe how the present invention compares a log with GROK patterns to form a group. First, from a log using a LOW_EX setting, the present invention identifies its structure (log structure). The present invention also extracts the underlying structures of a pattern using a LOW_EX setting (pattern structure). Next, if the log structure is field-wise parsed by the pattern-structure, then corresponding pattern is added to the similar pattern-group. Now, there are two cases to consider for the pattern-structure: without wildcards and with wildcards (note that the present invention initially does not produce wildcards, however a user may introduce wildcards by editing an automatically generated pattern-set). The first case is easy to handle, while the second case is more complicated. To solve the wildcard issue, the present invention uses a variant of the dynamic programming-based Wildcard Pattern Matching (WPM) problem. In WPM, the alphabet is [a-z], while the present invention's alphabet includes different data types as defined in TABLE 1.

Besides, in the present invention, some data types can be parsed by the more general data types. For example, "WORD", "NUMBER", and "IP" can be parsed by "NOTSPACE", but not vice versa. In our WPM variant, log-structure is analogous to text and pattern-structure is analogous to pattern, and if WPM returns true then we add the corresponding pattern in the similar pattern-group.

A description will now be given regarding the stateful log sequence anomaly detector 135, in accordance with an embodiment of the present invention.

The log sequence anomaly detector 135 detects abnormal log sequence in an event (or transaction). Here, we define an event as follows: an event is an independent operational work unit of a business process with a finite action sequence such as, for example, but not limited to, database transaction, system operation, and so forth. The system generates a log for each of the action sequences in an event. A malfunctioning event follows an unusual/deviated action sequence, which may lead to system failure. In the present invention, the log sequence anomaly detector 135 analyzes a log sequence in an event and detects an anomaly if it is malfunctioning.

Logs in an event may not be always homogeneous. Thus, detecting anomalous log sequence from incoming logs is a challenging problem as it requires to discover events, and to preserve log sequence information (i.e., state) in memory. Existing log sequence anomaly detectors are supervised as they need human input for discovering events and do not work for heterogeneous logs. Here, the present invention provides an unsupervised algorithm handling heterogeneous logs. To this end, the present invention proposes a novel log sequence-based anomaly detection algorithm that discovers event automatically using a finite state automaton (FSA) based model. It is to be noted that the algorithm can be implemented in hardware, for example, using an Application Specific Integrated Circuit (ASIC), and so forth.

The present invention has learning and detection phases. During the learning phase, it builds a model that captures normal behavior of an event. First, it discovers event ID Field automatically from heterogeneous logs. Next, it builds automata which have rules/patterns that represent normal event log sequences.

A description will now be given regarding model building, in accordance with an embodiment of the present invention.

To that end, a description will now be given regarding automatic event ID field discovery.

The log parser 130 parses input logs and sends the parsed input logs to log sequence anomaly detector 135. Each parsed log has a log pattern and a field set. We discover a unique ID Field from these parsed logs in an event because ID appears the same in multiple logs in an event. We use a variant of the A priori based technique. A challenge is to discover events from a large volume of logs with varying formats. Our algorithm has following two main steps as follows.

Building a reverse index. We build a reverse index of log fields based on their field content. First, we extract all field contents from a parsed log. Next, we build a reverse index table. Each field content is a key and a list of logs with (log pattern, field) pair as a value in the reverse index table.

ID Field discovery. We discover ID Field for all possible log patterns. We scan the reverse index. For each possible event ID content, we build a list of (log pattern, field) pairs for all logs that have this ID content. This gives us multiple lists and we take a set of unique lists. If any list covers all log patterns in the learning logs, it is assigned to our event ID Field.

A description will now be given regarding event automata modeling, in accordance with an embodiment of the present invention.

In this step, we profile automata with rules from logs using the ID field. We scan through each log and extract its ID Field and its content. We also keep track of its arrival rime. For an ID Field content, we keep a sorted list of log patterns with their fields. Finally, we merge them and build automata with rules. An automaton is built with states. Each log pattern with its ID Field is a state which stores a log's arrival time, a number of occurrences, and so forth. Each automaton has a beginning, an end, and multiple intermediate states. We also track the occurrence of the intermediate states, and the duration between the ending and beginning states. After building automata, we profile the minimum and maximum of those statistics (minimax duration of an event, min/max occurrence of intermediate states, and so forth), and use them as rules during anomaly detection.

A description will now be given regarding anomaly detection, in accordance with an embodiment of the present invention.

Log sequence anomaly detector 135 uses automata model with discovered ID Field set for all possible log patterns to detect an anomaly. Log sequence anomaly detector 135 identifies an anomalous sequence by scanning logs sent by the log parser 130 and stores them in anomaly store 140.

The present invention collects incoming logs in real-time. The present invention extracts log pattern and ID from each log. The present invention groups all logs that have a common ID. After that, it sorts log in each group based on their arrival time. This gives us incoming log sequence in an event as an event has a common event ID. The present invention scans logs in each group and validates against automata discovered during model learning. Each automaton has rules (i.e. min/max time duration of a sequence, minimax occurrence of states, and so forth). Logs in a sequence will be flagged as anomalies if they violate any of these rules. TABLE 4 shows various types anomalies reported by the present invention.

TABLE 4

| Type | Anomaly |
|---|---|
| 1 | Missing beginning/end event |
| 2 | Missing intermediate events |
| 3 | Min/Max occurrence violation of intermediate events |
| 4 | Min/Max time duration violation in between beginning and end event |

A description will now be given regarding various deployment challenges that may be encountered by the present invention.

Here, we emphasize two real-world deployment challenges to implementing the present invention as a service using Spark. We believe that these challenges and our proposed generic solutions will offer insights for building similar services in the near future.

A description will now be given regarding supporting model updates, in accordance with an embodiment of the present invention.

Challenges. Spark's data parallel execution model uses "broadcast" variables to load models and distributed data to all workers. Unfortunately, broadcast variables have been designed to be immutable, and can only be updated before data stream processing is started. The only possible way to update a model in Spark is to re-initialize and re-broadcast the model data to all workers. Unfortunately, this process can lead to drastic consequences: (1) it introduces a downtime of several seconds, if not minutes, depending on the size of the cluster; (2) restarting the cluster requires rescheduling and redistribution of data and memory leading to significant decrease in the throughput of the cluster; (3) if a stateful Spark streaming service is terminated, all the state data is lost, and losing states can have a significant impact on the efficacy of our anomaly detection algorithms. To eliminate any possibility of downtime or loss of state, the model update mechanism should meet the following requirements: (1) the service must be up and running all the time; and (2) states must be preserved during model updates.

Solution In the present invention, to update broadcast variables (BV) at run time, we modify the internal infrastructure of Spark (with minimum possible changes). Our solution is capable of rebroadcasting the immutable broadcast variables at run time without any concurrency issues and job termination. Broadcast variables are serializable data objects that are a virtual data block that includes a reference to actual disk blocks where the variable resides. When a broadcast variable is used in a Spark program, it is shipped to each individual worker. During the execution, when a worker requests the values of variables using the getValue( )method, it looks into the local data block of the worker for the variables. If that block is not found, then a pull request is sent to the driver (where the variable was initially stored) to get the variables from the network. Once this variable is received, it is stored into the local disk block of that worker. From now and so on, the local cache of the variable will be used whenever the getValue( ) method is called.

To rebroadcast such a variable which already resides in almost every individual worker, we invalidate all workers' local caches. Thus, when the getValue( )method is called, a pull request is made to driver. At driver, when a pull request is received, rather than handing over the original variable, the driver sends the new variable. The worker then receives the new variable and stores it in the local cache. From now and so on, the newly downloaded local copy of the variables will be used. Whenever a new model is issued from the model manager 152, the model is read, loaded, and then enrolled into a queue. The scheduler then waits for the current job to end.

Our dynamic model update implementation communicates with the block manager of each worker as well as the driver. We also maintain BV identifiers to maintain the same ID for the updated BV which is otherwise incremented at the update. This allows workers to contact the original BV after cache invalidation. Furthermore, we also added a thread safe queuing mechanism to avoid any race conditions due to extreme parallelization of Spark jobs.

To further explain, Spark data processing is a queue-based execution of the data received in every micro-batch. A model update process happens between these micro-batches in a serialized lock process. The model data itself is loaded in memory and an in-memory copy operation loads the data to the broadcast variables. The execution proceeds as normal, and whenever the broadcast value is required a fresh copy is fetched by the worker from the master. The only blocking operation is the in-memory copy operation, and hence the overhead is directly dependent on the size of the models. In practice, we found this to be negligible, and not impact any slow-down on the present invention.

A description will now be given regarding expedited anomaly detection, in accordance with an embodiment of the present invention.

Challenges. The present invention focuses on real-time anomaly detection. Thus, it is essential to report anomalies as soon as they occur. At the same time, to allow for scalable and fast execution, we focus on a data-parallel algorithm to distribute the processing workload of incoming logs across worker nodes. Data partitioning logic is only constrained by grouping together logs which have an inherent causal dependency on each other (for example, the same model, source, and so forth). This allows us to optimize performance, and to avoid performance bottlenecks as much as possible.

In a stateful anomaly detection, each log is independent of the other hence when the log comes, anomalies can be reported to the user. However, there are several real-world issues which are potentially problematic especially in the case of "stateful anomalies" which depend on previous states. Some of these are as follows:

What if a transaction fails and no log comes at all from a source or for a particular key or pattern of the model? Essentially, the saved state is already "anomalous", but cannot be reported since we have no concrete log as evidence. In this case, the anomaly would never be reported.

Similarly, if logs of certain automata are coming very infrequently (several hours apart). This could be because of an overload in the target system. In such a scenario, the anomaly may not be reported in time for any countermeasures to be taken.

Traditional timeout-based approaches cannot be used as they use system time, which can be very different from "Log Time". The log timestamps may be coming faster or slower than the actual time progress within the system. Hence, only the log rate of embedded timestamps within the logs can be used to predict timestamps in the case of the absence of logs.

Furthermore, the key based mapping of states only allows similar keys to access or modify the state. Even if somehow we receive an event that informs the program logic to flush the unnecessary states, there is currently no way to access the states without their keys.

Solution. To allow for expedited real-rime anomaly detection, we use an external periodic physical heartbeat message. Each log source has its own heartbeat message, and periodically sends a log to our stream processing engine if the agent is still active. The heartbeat message is embedded with a timestamp based on the last log observed, and the rate of logs from that source. Hence in the absence of logs being generated, the heartbeat message gives our anomaly detection engine the current time of the target systems, allowing us to proceed with anomaly detection.

To enable memory management of open states, we extend the current API of Spark to expose the reference of the state in a partition to the program logic. Within the program logic, a user can access the state map by calling the getParentStateMap( ) method on a state object. This method returns the reference to the state map object where all the states that partitions are stored. For anomaly detection, this state map is enumerated to find the states that are open and expired with respect to the current log time. Although we do not have the key to an open state, we are still able to access that state and report the anomaly which would otherwise go entirely undetected. Due to the event-driven nature of Spark's stream processing, we need a trigger on all the partitions in the case when the data is not arriving frequently.

To overcome this challenge, we have designed our own heartbeat-based trigger as an external add-on for Spark. It receives a heartbeat message from the heartbeat controller 160 to trigger the expired states' detection process at every single partition This message comes on the same data channel with a specific tag of the heartbeat message. If such a message is observed in program logic, the heartbeat partitioner kicks in and duplicates this message p times, where p is the number of partitions. Then each of the duplicated message passes through a custom broadcast partitioner that sends the i-th duplicate to the i-th partition. This custom broadcast partitioner is a part of the heartbeat add on and assigns normal data to regular partitioner logic and a heartbeat message to a custom partitioner logic. After passing through this custom partitioner, the messages are received by the stateful operations where the anomaly detection algorithm will iterate over the states to detect anomalies. This procedure is performed on all the partitions on every single worker since the message is duplicated and broadcast to each partition on the data channel.

Figure 8:
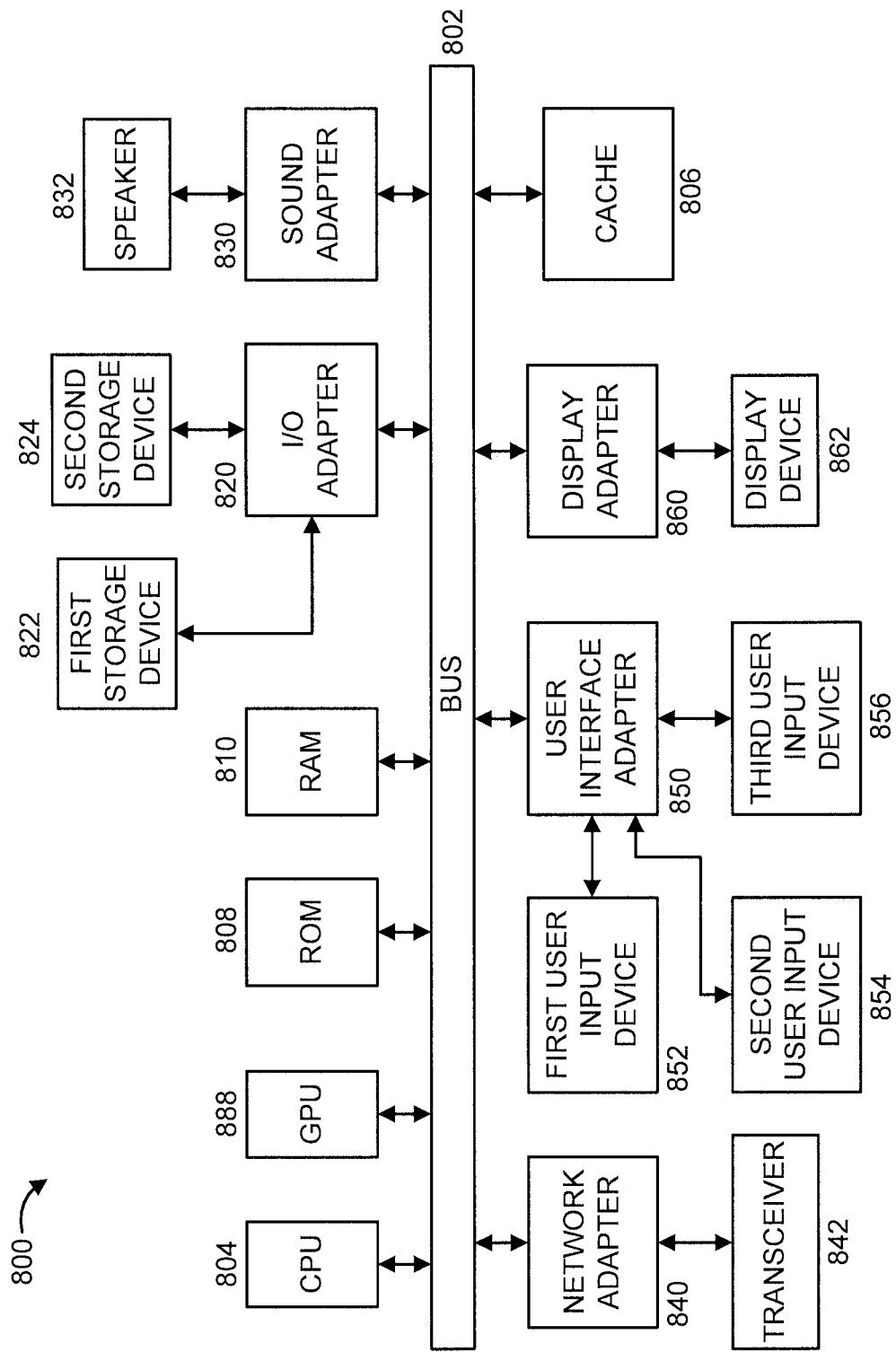
FIG. 8 is a block diagram showing an exemplary processing system to which the present principles may be applied, according to an embodiment of the present principles.

FIG. 8 is a block diagram showing an exemplary processing system 800 to which the present principles may be applied, according to an embodiment of the present principles.

The processing system 800 includes at least one processor (CPU) 804 operatively coupled to other components via a system bus 802. A cache 806, a Read Only Memory (ROM) 808, a Random-Access Memory (RAM) 810, an input/output (I/O) adapter 820, a sound adapter 830, a network adapter 840, a user interface adapter 850, and a display adapter 860, are operatively coupled to the system bus 802. At least one Graphics Processing Unit (GPU) 888 is operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Moreover, it is to be appreciated that system 100 and system 600 described above with respect to FIG. 1 and FIG. 6, respectively, are systems for implementing respective embodiments of the present principles. Part or all of processing system 800 may be implemented in one or more of the elements of system 100 and/or system 600.

Figure 9:
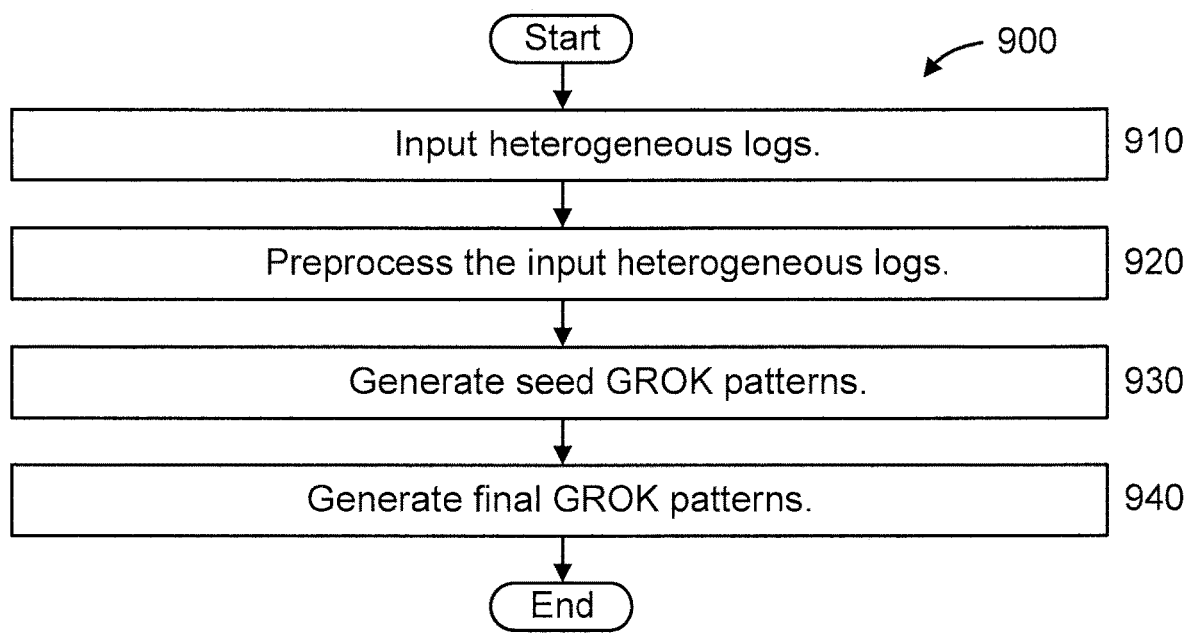
FIG. 9 is a flow diagram showing a method for pattern discovery in heterogeneous logs, in accordance with an embodiment of the present invention.
Figure 10:
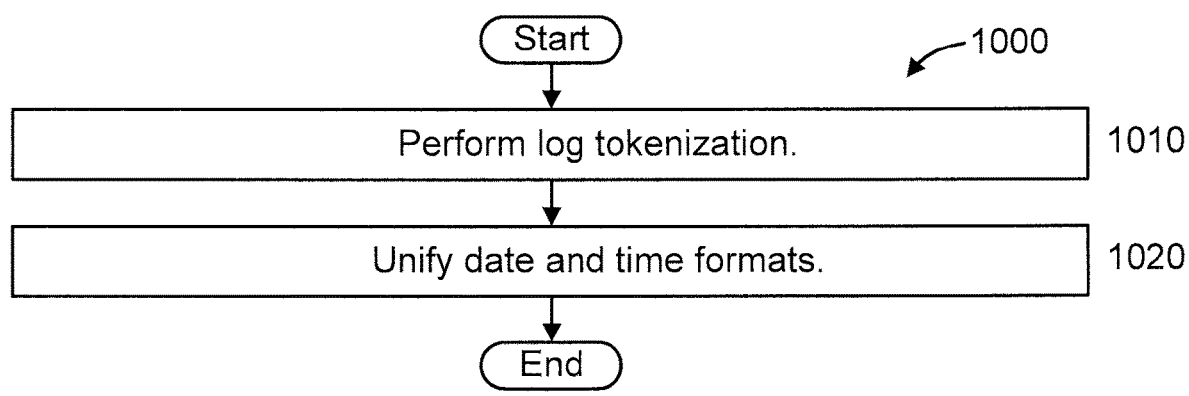
FIG. 10 is a flow diagram further showing a block of the method of FIG. 9, in accordance with an embodiment of the present invention.
Figure 11:
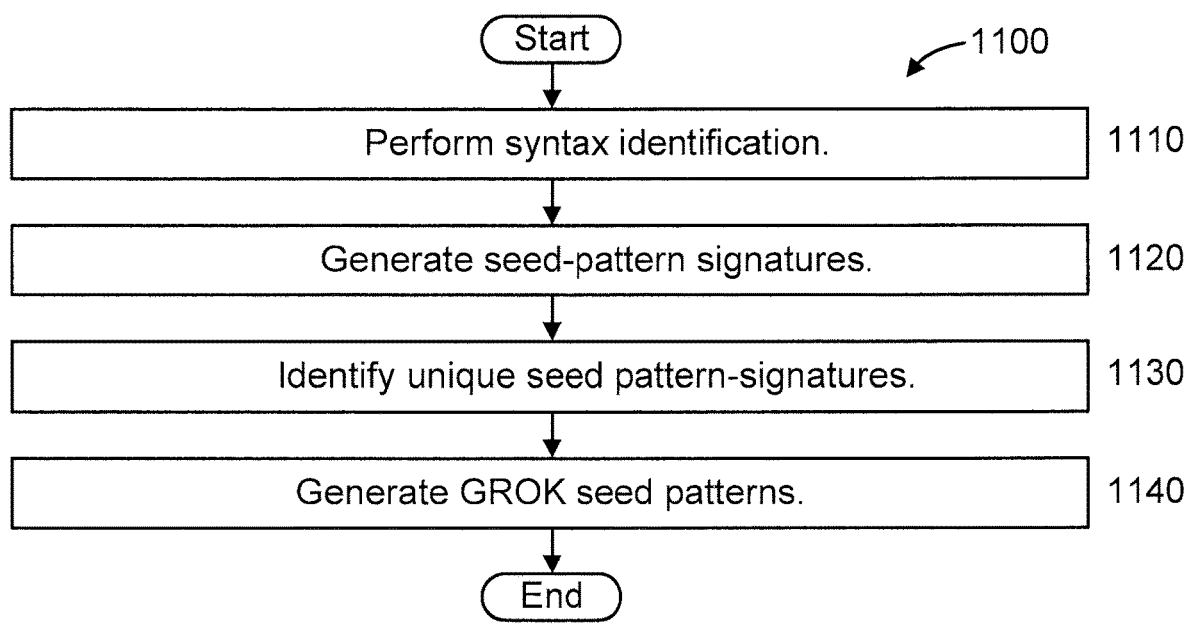
FIG. 11 is a flow diagram further showing another block of the method of FIG. 9, in accordance with an embodiment of the present invention.
Figure 12:
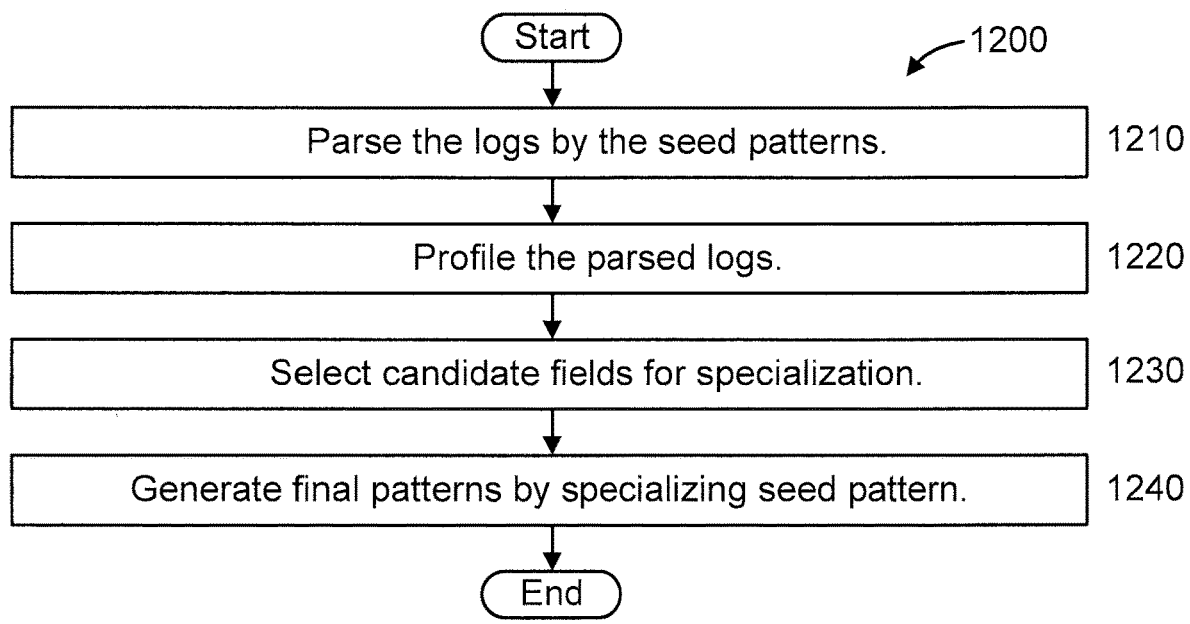
FIG. 12 is a flow diagram further showing yet another block of the method of FIG. 9, in accordance with an embodiment of the present invention.

Further, it is to be appreciated that processing system 800 may perform at least part of the methods described herein including, for example, at least part of method 200 of FIGS. 2-5 and/or at least part of method 700 of FIG. 7 and/or at least part of method 900 of FIG. 9, and/or at least part of method 1000 of FIG. 10 and/or at least part of method 1100 of FIG. 11 and/or at least part of method 1200 of FIG. 12. Similarly, it is to be appreciated that system 100 and/or system 600 may perform at least part of the methods described herein including, for example, at least part of method 200 of FIGS. 2-5 and/or at least part of method 700 of FIG. 7 and/or at least part of method 900 of FIG. 9, and/or at least part of method 1000 of FIG. 10 and/or at least part of method 1100 of FIG. 11 and/or at least part of method 1200 of FIG. 12.

A description will now be given regarding field content based pattern generation for heterogeneous logs, in accordance with an embodiment of the present invention.

In an embodiment, the present invention addresses the issue of efficiently generating a set of regular expressions from a set of heterogeneous logs so that all of the logs can be correctly parsed. As used herein, each regular expression is denoted as a "pattern".

In an embodiment, the present invention provides a method, interchangeably referred to herein as "FPGA" (short for "Field-content based Pattern Generation Algorithm"), that extracts high quality patterns for a given set of logs. FPGA is fast, memory efficient, accurate and scalable, and it can be implemented in a parallel manner. FPGA is also completely unsupervised and data-driven which makes it suitable for handling heterogeneous logs.

FPGA is a two-pass algorithm that does not use any similarity metric and does not produce a pattern tree. In the first pass, it normalizes the log contents into some basic datatypes based on the syntax of contents and generates a seed-pattern set. In the second pass, for every seed pattern, FPGA identifies a set of fields, and specializes them using the content observed in the input logs to produce multiple new patterns to include in the final pattern-set.

In an embodiment, the present invention provides an end-to-end framework, FPGA, that addresses problems with existing log analysis tools and packages. FPGA is an unsupervised framework that scans log messages only once or twice and, therefore, can quickly process hundreds of millions of log messages with a very small amount of memory. It supports three different settings, which are very intuitive for the users to understand. In addition, it allows user to edit automatically generated pattern to meet their needs. In one or more embodiments, the present invention can provide the following contributions:

A log analytics framework, FPGA, is provided that recognizes patterns in millions of log messages with a very small memory footprint.

FPGA is an unsupervised framework requiring no involvement of an expert in the analysis process.

FPGA is robust to heterogeneity and can find patterns in logs generated from arbitrary applications running on arbitrary platforms.

FPGA is scalable to hundreds of millions of logs. FPGA reads the entire set of logs once and stores only a very small subset of log representative log messages in the memory.

FPGA is flexible as it has three predefined settings, namely HIGH, MEDIUM, and LOW. The default setting is MEDIUM. These settings are intuitive to users and give them upper and lower bounds of the number of patterns that will be automatically generated. The HIGH setting generates the largest number of patterns, while the LOW settings generate the lowest number of patterns. The MEDIUM setting can generates number of patterns in between the LOW and HIGH settings. In addition, FPGA allows users to automatically edit generated patterns to meet their needs.

FIG. 9 is a flow diagram showing a method 900 for pattern discovery in heterogeneous logs, in accordance with an embodiment of the present invention.

At block 910, input heterogeneous logs (hereinafter "input logs" in short). The input logs can be obtained from arbitrary/unknown systems and/or applications. The input logs include unstructured text content with one or more multiple fields. The logs may also include timestamps.

At block 920, pre-process the input logs. In an embodiment, block 920 preprocesses a log by splitting the log into tokens.

At block 930, generate seed GROK patterns. The seed GROK patterns are generated from the preprocessed logs.

At block 940, generate final GROK patterns. In an embodiment, block 940 specializes a selected set of fields in every seed pattern to generate the final pattern set.

FIG. 10 is a flow diagram further showing block 920 of the method 900 of FIG. 9, in accordance with an embodiment of the present invention.

At block 1010, perform log tokenization.

Further regarding block 1010, taking arbitrary heterogeneous logs (block 910 of method 900), a tokenization is performed in order to generate semantically meaningful tokens from logs. This block preprocesses a log by splitting it into individual units called tokens. Splitting is done based on a set of delimiters. The default delimiter set includes white space characters (i.e., space, tab, etc.). FPGA also allows users to provide delimiters to overwrite default delimiters in order to meet their needs. In addition, a user can provide regular expression (RegEx) based rules to split a token into multiple sub-tokens. For example, to split the token "123 KB" into two sub-tokens "123" and "KB", user can provide the following RegEx splitting rule: "[0-9]+ KB"→"[0-9]+KB".

At block 1020, unify date and time formats.

Further regarding block 1020, FPGA identifies date and time (i.e., timestamp) and unifies them into single DATETIME format "yyyy/MM/dd HH:mm:ss.SSS". For example, a log "Mar. 3, 2017 09:00:31 127.0.0.1 FPGA demo #1 123" will be converted to "2017/02/23 09:00:31.00 127.0.0.1 FPGA demo #1 123" after the timestamp unification. FPGA also allows users to provide date and time formats to identify timestamp fields. However, if user does not specify any formats, FPGA identify timestamps based on a set of predefined formats (for example, MM/dd HH:mm:ss, dd/MM HH:mm:ss:SSS, yyyy/MM/dd HH:mm:ss.SSS etc.) specified in a standard notation (for example, Java SimpleDateFormat).

FIG. 11 is a flow diagram further showing block 930 of the method 900 of FIG. 9, in accordance with an embodiment of the present invention.

At block 1110, perform syntax identification.

Further regarding block 1110, for every token FPGA identifies its semantics by assigning it one of the following data types—DATETIME, IP, NUMBER, and NOTSPACE (i.e., mix of alphabets, digits, and symbols) based on the RegEx rules. TABLE 1 shows some sample RegEx rules for identifying different data types in FPGA.

At block 1120, generate seed-pattern signatures.

Further regarding block 1120, the same identifies unique log structures from the information generated in block 1110 by generating seed-pattern-signatures. FPGA generates a seed-pattern-signature for every log by position-wise concatenating datatypes of tokens with spaces. The pattern-signatures for the log "2017/02/23 09:00:31.00 127.0.0.1 FPGA demo #1 123" would be "DATETIME IP NOTSPACE NUMBER".

At block 1130, identify unique seed pattern-signatures.

Further regarding block 1130, FPGA determines the uniqueness of seed-pattern-signatures by maintaining an index. An index entry includes a pattern-signature as key and its associated metadata as a value. Metadata is a counter value. Later, FPGA uses these to generate statistics for the patterns, i.e., the total number of logs parsed by each seed pattern. For every log, FPGA searches this index using its pattern-signature. If match is found, then that means that FPGA has already discovered a log having a similar log-structure, so it simply discards it and increases the counter by one. Otherwise, FPGA stores the pattern-signature with associated metadata in the index and sets the counter value to one.

At block 1140, generate GROK seed patterns.

Further regarding block 1140, FPGA generates one seed-pattern for every seed-pattern-signature index entry in the form of a GROK expression. FPGA assigns a field ID for each variable field generated from a data type. The field ID includes two parts: the ID of the log pattern that this field belongs to; and the sequence number of this field compared to other fields in the same pattern. The log format pattern IDs can be assigned with the integer number 1, 2, 3, ... m for a seed-pattern set of size m, and the field sequence order can be assigned with the integer number 1, 2, 3, ... k for a log pattern with k data types. TABLE 3 shows GROK patterns produced for the three pattern setting specifications. FPGA also tags the datatype information in the field names of the GROK patterns—"DATETIME" is tagged by "TS", "IP" is tagged by "IP", "NUMBER" is tagged by "NU", and "NOTSPACE" is tagged by "NS". This tagging helps in block 940 to quickly identify the datatype of a field by simply looking at the fieldname syntax. The seed GROK pattern for "2017/02/23 09:00:31.000 127.0.0.1 FPFA demo #1 123" would be "%{DATETIME: P1TS1} %{IP: P1IP2} %{NOTSPACE: P1NS3} %{NOTSPACE: P1NS4} %{NUMBER:P1NU5}".

FIG. 12 is a flow diagram further showing block 940 of the method 900 of FIG. 9, in accordance with an embodiment of the present invention.

At block 1210, parse the logs by the seed patterns.

Further regarding block 1210, FPGA parses the preprocessed logs produced in block 920, by parsing them by seed patterns generated in block 930. For example, "2017/02/23 09:00:31.000 127.0.0.1 FPFA demo #1 123" would be parsed by "%{DATETIME: P1TS1} %{IP: P1IP2} %{NOTSPACE: P1NS3} %{NOTSPACE: P1NS4} %{NUMBER:P1NU5}", and it produces the JSON output: {"P1TS1": "2017/02/23 09:00:31.000", "P1IP2": "127.0.0.1", "P1NS3": "FPGA", "P1NS4": "demo #1", "P1NU5": 123}.

At block 1220, profile the parsed logs.

Further regarding block 1220, for every NOTSPACE field datatype of a parsed output of a log message, FPGA maintains an index to profile its content. This index is used later to make candidate selection decision. In the index "key" is the field content, and "value" is a frequency counter. For every parsed log output, FPGA lookups all associated field indexes. If a match is found, that means that FPGA has already found similar field content before and increase its counter value by one. Otherwise, FPGA stores the content in the associated field index, and set its counter value to one. For the parsed output of the seed pattern P1 in the example shown in block 1110, FPGA will profile only P1NS3 and P1NS4 fields. By default, FPGA does not profile fields having DATETIME, IP, and NUMBER datatypes as the values in these fields corresponds to variables in most of the computing systems. However, if a user decides to profile any of these three datatypes, then the user can include them in the FPGA profiling list.

At block 1230, select candidate fields for specialization.

Further regarding block 1230, FPGA selects a set of candidate fields for specialization from each seed pattern by using the profiled information collected in block 1220. Here, we define specialization as a procedure, which replaces a datatype by the values seen in the input logs. For example, a seed GROK pattern in block 930 is "%{DATETIME: P1TS1} %{IP: P1IP2} %{NOTSPACE: P1NS3} %{NOTSPACE: P1NS4} %{NUMBER:P1NU5}", and after parsing all input logs using this pattern in block 1210, and profiling its contents following block 1220, we find that P1NS3 has only possible values as follows: "FPGA", and "LogMine". Now, if FPFA specializes this seed pattern using P1NS3's specific values, then we will have two new patterns for the final pattern set as follows: (1) "%{DATETIME: P1TS1} %{IP: P1IP2} FPGA %{NOTSPACE: P1NS4}%{NUMBER:P1NU5}", and (2) "%{DATETIME: P2TS1} %{IP: P2IP2} LogMine %{NOTSPACE: P2NS4} %{NUMBER:P2NU5}".

FPFA applies the following heuristic rules to select a set of specialization fields for the seed patterns:

Rule 1. FPGA filters out fields having DATETIME, IP, and NUMERIC thus it considers fields with only NOTSPACE datatype.

Rule 2. After filtering fields by Rule 1, FPGA selects fields with unique cardinality. Here, we define cardinality as follows: the number of unique elements stored in a field index for the corresponding field. Field with unique cardinality contains only one fixed value.

Rule 3. After filtering fields by Rule 1, FPGA applies three sub-rules.

Rule 3(a). For the fields having cardinality more than one, if its fieldStability is at least a threshold value, FPGA selects them as a potential-candidate-field list. The fieldStablity is defined as follows:

$$1 - \frac{cardinality}{logsCoveredBySeedPattern}.$$

The default threshold for the fieldStablity is set to 0.95. However, users can also change this threshold to satisfy their needs. If a field does not satisfy this threshold, then FPGA does not consider it for specialization as it will have very low stability, i.e., its contents varying most of the time.

Now, for all fields satisfying fieldStability threshold, FPGA calculates COV (coefficient of variance) and mean statistics of the cardinality distribution. The COV is defined as follows:

$$\frac{standardDeviation}{mean}.$$

If COV is at most a threshold value, then FPGA still considers it as potential specialization candidate. The default COV threshold is 0.05. However, users can also change it to meet their specific needs.

FPGA also determines a field's uniformity based on its contents frequency distribution using ChiSquare statistic with at least 95% confidence. Users can change this confidence level to meet their needs. If a field is uniform, then FPGA selects it for the final specialization list only if it satisfies at least one of these two rules:

Rule 3(b). If all candidate fields COV is not more than the COV threshold—FPGA selects all fields satisfying COV constraint.

Rule 3(c). If a candidate field's cardinality is less or equal to the mean of the cardinality distribution, then FPGA select fields having low cardinalities.

At block 1240, generate final patterns by specializing seed pattern.

Further regarding block 1240, by using the rules in block 1230, FPGA generates final patterns from the seed patterns by using three different settings, namely LOW, HIGH, and MEDIUM. Users can choose any one of these settings to control the final pattern-set. The default is set to the MEDIUM setting. The rules used by FPGA for the three different pattern settings can be as follows:

LOW: FPGA specializes all unique fields (having a cardinality value of one) except fields having DATETIME or IP or NUMBER datatype of a seed pattern, by applying Rule 1 and Rule 2 in block 1230.

HIGH: FPGA specializes all fields with high fieldStablity except fields having DATETIME or IP or NUMBER datatype of a seed pattern, by applying Rule 1, Rule 2, and Rule 3(a) in block 1230.

MEDIUM: FPGA specializes all unique fields (having a cardinality value of one) as well as some selected fields based on some heuristic rules, and it skip fields having DATETIME or IP or NUMBER datatype of a seed pattern, by applying Rule 1, Rule 2, Rule 3(a), Rule 3(b), and Rule 3(c) in block 1230.

Various advantages of the present invention will now be described, in accordance with one or more embodiments of the present invention.

One advantage is that the present invention provides an algorithm which no (or minimal) human involvement.

Another advantage is that the present invention provides a two-pass algorithm to generate patterns based on syntax of the log contents. The time complexity of our algorithm is O(1).

Yet another advantage is that the present invention uses the statistical properties of the log contents observed in the input logs to generate patterns.

Still another advantage is that the present invention provides users with an option to control the quality of the patterns.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined in the appended claims. Having thus described aspects of the invention, with the details and particularity required by the patent laws, what is claimed and desired protected by Letters Patent is set forth in the appended claims.

The invention claimed is:

1. A system for pattern discovery in input heterogeneous logs having unstructured text content and one or more fields, the system comprising:
 a memory; and
 a processor in communication with the memory, wherein the processor runs program code to:
  preprocess the input heterogeneous logs to obtain preprocessed logs by splitting the input heterogeneous logs into tokens;
  generate seed patterns from the preprocessed logs; and
  generate final patterns by specializing a selected set of fields in each of the seed patterns to generate a final pattern set;
 wherein the processor generates the seed patterns by running program code to:
  identify semantics of the tokens by assigning one of a plurality of semantic datatypes to the tokens based on Regular Expression rules;
  generate seed-pattern signatures, wherein a seed-pattern signature is generated for each of the heterogeneous input logs by position-wise concatenating the semantic datatypes of the tokens therein with spaces; and
  identify unique seed-pattern signatures from the seed-pattern signatures using an index, wherein each index entry includes the seed-pattern signature as an index key and associated metadata obtained as a counter value as an index value;
 wherein the processor generates the seed patterns by running code to:
  search the index for a given seed-pattern signature;
  discard the given seed-pattern signature responsive to a matching one being found in the index and increasing the counter value; and
  add the given seed-pattern signature to a database of seed-pattern signatures responsive to an absence of the matching one in the index.

2. A system for pattern discovery in input heterogeneous logs having unstructured text content and one or more fields, the system comprising:
 a memory; and
 a processor in communication with the memory, wherein the processor runs program code to:
  preprocess the input heterogeneous logs to obtain preprocessed logs by splitting the input heterogeneous logs into tokens;
  generate seed patterns from the preprocessed logs; and
  generate final patterns by specializing a selected set of fields in each of the seed patterns to generate a final pattern set;
 wherein the processor generates the seed patterns by running program code to:
  identify semantics of the tokens by assigning one of a plurality of semantic datatypes to the tokens based on Regular Expression rules;
  generate seed-pattern signatures, wherein a seed-pattern signature is generated for each of the heterogeneous input logs by position-wise concatenating the semantic datatypes of the tokens therein with spaces; and identify unique seed-pattern signatures from the seed-pattern signatures using an index, wherein each index entry includes the seed-pattern signature as an index key and associated metadata obtained as a counter value as an index value;

wherein the processor generates the seed patterns by running code to generate a single seed-pattern for every seed-pattern signature in the index.

3. A system for pattern discovery in input heterogeneous logs having unstructured text content and one or more fields, the system comprising:

a memory; and a processor in communication with the memory, wherein the processor runs program code to:

preprocess the input heterogeneous logs to obtain pre-processed logs by splitting the input heterogeneous logs into tokens;

generate seed patterns from the preprocessed logs; and generate final patterns by specializing a selected set of fields in each of the seed patterns to generate a final pattern set;

wherein the processor generates the final patterns by running the program code to parse the preprocessed logs using the seed patterns to obtain parsed logs.

4. The system of claim 3, wherein the processor generates the final patterns by running code to (i) profile the parsed logs to obtain various statistics and (ii) select the set of fields in each of the seed patterns to generate the final pattern set based on the profile results.

5. A system for pattern discovery in input heterogeneous logs having unstructured text content and one or more fields, the system comprising:

a memory; and a processor in communication with the memory, wherein the processor runs program code to:

preprocess the input heterogeneous logs to obtain pre-processed logs by splitting the input heterogeneous logs into tokens;

generate seed patterns from the preprocessed logs; and generate final patterns by specializing a selected set of fields in each of the seed patterns to generate a final pattern set;

wherein the processor generates the final patterns from the seed patterns by running program code to select from among a plurality of pattern specializing settings selected from the group consisting of a low setting, a medium setting, and a high setting.

6. The system of claim 5, wherein different ones of the plurality of pattern specializing settings specialize different ones of the fields in each of the seed patterns to generate the final pattern set.

7. A system for pattern discovery in input heterogeneous logs having unstructured text content and one or more fields, the system comprising:

a memory; and a processor in communication with the memory, wherein the processor runs program code to:

preprocess the input heterogeneous logs to obtain pre-processed logs by splitting the input heterogeneous logs into tokens;

generate seed patterns from the preprocessed logs; and generate final patterns by specializing a selected set of fields in each of the seed patterns to generate a final pattern set;

wherein multiple ones of the tokens of a given field are concatenated using a specialized connector configured such that the concatenated multiples ones of the tokens are processed as a single token by a pattern generator used by the processor to generate the seed patterns.

8. A system for pattern discovery in input heterogeneous logs having unstructured text content and one or more fields, the system comprising:

a memory; and a processor in communication with the memory, wherein the processor runs program code to:

preprocess the input heterogeneous logs to obtain pre-processed logs by splitting the input heterogeneous logs into tokens;

generate seed patterns from the preprocessed logs; and generate final patterns by specializing a selected set of fields in each of the seed patterns to generate a final pattern set;

wherein the final patterns are generated as GROK patterns having a form that includes a syntax component and a semantic component, the syntax component denoting a pattern name to Regular Expressions text matching methodology and the semantic component denoting an identifier for a Regular Expressions text being matched.

* * * * *